United States Patent
Wang et al.

(10) Patent No.: US 12,359,048 B2
(45) Date of Patent: Jul. 15, 2025

(54) HETEROPHASIC POLYOLEFIN COMPOSITION

(71) Applicant: Borealis AG, Vienna (AT)

(72) Inventors: Jingbo Wang, Linz (AT); Markus Gahleitner, Linz (AT); Klaus Bernreitner, Linz (AT); Pauli Leskinen, Porvoo (FI)

(73) Assignee: BOREALIS AG, Vienna (AT)

( * ) Notice: Subject to any disclaimer, the term of this patent is extended or adjusted under 35 U.S.C. 154(b) by 133 days.

(21) Appl. No.: 17/571,704

(22) Filed: Jan. 10, 2022

(65) Prior Publication Data
US 2022/0227983 A1    Jul. 21, 2022

(30) Foreign Application Priority Data
Jan. 14, 2021 (EP) ..................... 21151520

(51) Int. Cl.
| | | |
|---|---|---|
| *C08L 23/22* | (2025.01) | |
| *C08F 10/08* | (2006.01) | |
| *C08F 10/10* | (2006.01) | |
| *C08F 210/08* | (2006.01) | |
| *C08F 210/10* | (2006.01) | |
| *C08L 23/14* | (2006.01) | |

(52) U.S. Cl.
CPC .............. *C08L 23/22* (2013.01); *C08F 10/08* (2013.01); *C08F 10/10* (2013.01); *C08F 210/08* (2013.01); *C08F 210/10* (2013.01); *C08L 23/14* (2013.01); *C08L 23/142* (2013.01); *C08L 2205/02* (2013.01); *C08L 2205/03* (2013.01); *C08L 2205/24* (2013.01); *C08L 2207/066* (2013.01); *C08L 2314/06* (2013.01)

(58) Field of Classification Search
CPC ........ C08L 23/22; C08L 23/14; C08L 23/142; C08F 10/08
See application file for complete search history.

(56) References Cited

U.S. PATENT DOCUMENTS

| | | | |
|---|---|---|---|
| 2008/0085977 A1* | 4/2008 | Okamoto ................ | C08L 23/10 525/240 |
| 2011/0212283 A1* | 9/2011 | Fantinel ............... | C08L 23/0815 526/170 |

FOREIGN PATENT DOCUMENTS

WO     WO-2020001191 A1 *  1/2020   ............... B32B 1/00

\* cited by examiner

*Primary Examiner* — Ling Siu Choi
*Assistant Examiner* — David L Miller
(74) *Attorney, Agent, or Firm* — Lippes Mathias LLP

(57) ABSTRACT

A heterophasic polyolefin composition comprising 55 to 95 wt.-% based on the total weight of the heterophasic polyolefin composition of a propylene butene random copolymer (A) having an $MFR_2$ (230° C.) of 0.3 to 100.0 g/10 min and a butene content of 1.5 to 8.0 wt.-%, wherein the propylene butene random copolymer is obtained by a process using a single site catalyst (I) and 5 to 45 wt.-% based on the total weight of the heterophasic polyolefin composition of a copolymer of ethylene (B) having a density in the range of 910 to 935 kg/m³ and an $MFR_2$ (190° C.) of 0.5 to 10 g/10 min, wherein the copolymer of ethylene (B) is obtained by a process using a single site catalyst (II).

20 Claims, No Drawings

HETEROPHASIC POLYOLEFIN COMPOSITION

The present invention is concerned with a heterophasic polyolefin composition having low haze as well as a good balance of stiffness and impact properties. In particular, this invention relates to a heterophasic polyolefin composition comprising a propylene butene random copolymer and an ethylene based copolymer both being prepared using a single site catalyst. Furthermore, the present invention also concerns a process for the production of said heterophasic polyolefin composition. Finally, the present invention relates to the use of said heterophasic polyolefin composition in injection-moulding and film applications and to articles, such as injection-moulded articles or films, comprising said heterophasic polyolefin composition.

BACKGROUND

Polypropylene is widely used in film and moulding applications, including caps & closure, thin wall packaging, houseware and similar applications. In these applications, a combination of high stiffness and good impact strength is required. Moreover, often also a low haze is needed, i.e. to improve optical properties, for example see-through performance in food packaging applications.

Heterophasic polypropylene copolymers lead to a very good balance of stiffness and impact properties but the haze of such materials can be poor due to the dispersed rubber phase having a different refractive index, which leads to light scattering and thus non-transparent materials.

Polymers with higher stiffness may allow for the use of lower film thicknesses, leading to both material and energy savings. Good impact behaviour is also essential so that the contents of the packaging remain safely contained, even if dropped. Polymers with good optical properties, such as low haze, are desired in applications wherein it is important to the consumer to be able to see the content of the packaged goods through the packaging.

Polypropylene random copolymers are widely used in such packaging applications due to their good balance of properties. Typically, these are copolymers of propylene and ethylene. Propylene-butene copolymers are also known in packaging applications (e.g. as described in EP 3 257 878 A1, EP 3 257 877 A1), however the majority of these grades are made using Ziegler-Natta catalysts.

In order to fulfil the different requirements of the packaging, however, and provide the necessary balance of properties in terms of stiffness and impact, the propylene copolymers are typically blended with other polyolefins. These modifications do not come without disadvantage. For example, including a rubber (elastomer) phase can improve impact strength but may reduce the stiffness and transparency of the resultant article. Examples of blends of propylene copolymers with elastomers are disclosed in EP 0 575 465 A1. Again, many of these are prepared using Ziegler-Natta catalysts. Since the presence of the elastomer typically has adverse effects on the stiffness and transparency, attainment of an improved balance of properties often necessitates the inclusion of further elastomers or other polymers as compatibilizers, resulting in blends of three or more polymers. For example, EP 2 831 168 A1 and EP 1 820 821 A1 employ a styrenic based elastomer. EP 0 895 526 A1 and EP 1 833 909 A1 used two different types of ethylene elastomers. Other solutions target the combination with plastomers and LDPE (EP 2 424 729 A1). These multi-component blends, however, are necessarily more costly and time consuming to prepare. Furthermore, in such materials containing LDPE or other compatibilizers, stiffness and transparency are sacrificed to some extent.

To avoid such compatibilizers, specific heterophasic polyolefin compositions have been developed comprising a propylene-butylene matrix phase and particular ethylene/$C_3$-$C_{12}$ alpha olefin plastomers having a density of less than 904 kg/m³ produced by Ziegler-Natta catalysts (WO 2018/210476 A1). Such compositions show good haze at acceptable balance of stiffness and impact properties.

One major disadvantage associated with the use of Ziegler-Natta catalysts is that they tend to produce an increased amount of oligomers during polymerization. This, in turn, has drawbacks in view of the definition of the properties (stiffness, impact, haze) and their balance, but also in view of restrictions in food packaging or pharmaceutical applications. Furthermore, high comonomer contents are needed in polymerisation with Ziegler-Natta catalysts in order to achieve the low melting temperatures, which are particularly desirable for film applications.

OBJECT OF THE INVENTION

It is thus an object of the present invention to provide a new polyolefin composition, which can overcome at least some of the problems associated with those currently employed. In particular, a polyolefin composition offering an improved balance of stiffness, impact and optical properties for application in the packaging field, particular as a moulded article or film, is searched for. In particular, a composition which can offer these properties with the minimal number of components is desired. Furthermore, a process for the production thereof is searched for.

SUMMARY OF THE INVENTION

It now has been surprisingly found that above-mentioned object can be achieved by a heterophasic polyolefin composition comprising 55 to 95 wt.-% based on the total weight of the heterophasic polyolefin composition of a propylene butene random copolymer (A) having an $MFR_2$ (230° C.) of 0.3 to 100 g/10 min and a butene content of 1.5 to 8.0 wt.-%, wherein the propylene butene random copolymer is obtained by a process using a single site catalyst, and 5 to 45 wt.-% based on the total weight of the heterophasic polyolefin composition of a copolymer of ethylene (B) having a density of 910 to 935 kg/m³ and an $MFR_2$ (190° C.) of 0.5 to 10 g/10 min, wherein the copolymer of ethylene is obtained by a process using a single site catalyst.

It has been further surprisingly found that above-mentioned object is achieved by a process for the preparation of said heterophasic polyolefin composition, comprising the steps of polymerizing the propylene butene random copolymer (A) and polymerizing copolymer of ethylene (B) and mixing and/or blending the propylene butene random copolymer and the copolymer of ethylene.

Finally, it has been also surprisingly found that above-mentioned object can be achieved by an article, preferably a film or a moulded article, comprising said heterophasic polyolefin composition. It has further been found that said polyolefin compositions are in particular suitable for mechanical recycling of respective articles made therefrom.

Definitions

The term 'heterophasic composition' as used herein means that two distinct phases are present in the composition, i.e. a propylene copolymer matrix phase and an ethylene copolymer phase. Presence of the two phases is easily detectable via DSC analysis: the crystalline propylene butene copolymer matrix will show a melting point higher than that of the ethylene copolymer component.

The term 'copolymer of [monomer]' as used herein denotes a polymer the majority by weight of which derives from the [monomer] units (i.e. at least 50 wt.-% [monomer] relative to the total weight of the copolymer).

The term 'multimodal polymer' as used herein denotes a polymer composition comprising at least two polymer fractions, which have been produced under different polymerisation conditions resulting in different (weight average) molecular weights and molecular weight distributions for the fractions or different comonomer distributions. The prefix 'multi' relates to the number of different polymer fractions the polymer is consisting of. The term 'multimodal polymer' thus comprises bimodal polymers.

DESCRIPTION OF THE INVENTION

In the following, the heterophasic polyolefin composition of the present invention as well as the process for the preparation of said heterophasic polyolefin composition are described in detail.

Heterophasic Polyolefin Composition

Preferably, the heterophasic polyolefin composition has an $MFR_2$ (230° C.) in the range of 0.3 to 50 g/10 min. More preferably, the composition has an $MFR_2$ of 20.0 g/10 min or less, even more preferably 10.0 g/10 min or less, further even more preferably 5.0 g/10 min or less,. The heterophasic polyolefin composition preferably has an $MFR_2$ of 0.3 g/10 min or more, more preferably of 0.5 g/10 min or more, even more preferably of 1.0 g/10 min or more. Thus, particularly suitable ranges for the $MFR_2$ of the heterophasic polyolefin composition are from 0.5 to 10.0 g/10 min, most preferably from 1.0 to 5.0 g/10 min.

Preferably, the heterophasic polyolefin composition has a flexural modulus of at least 500 MPa, more preferably of at least 800 MPa, even more preferably of at least 900 MPa, and most preferably of at least 1000 MPa. Preferably, the heterophasic polyolefin composition has a flexural modulus of less than 1600 MPa, more preferably of less than 1400 MPa. Thus, particularly suitable ranges for the flexural modulus of the heterophasic polyolefin composition are from 500 to 1600 MPa, most preferably from 900 to 1400 MPa.

The polyolefin composition according to the present invention preferably has a Charpy notched impact strength (measured on injection molded test specimens in accordance with ISO 179 1eA at 23° C. (NIS (+23° C.)) of above 8.0 $kJ/m^2$, more preferably of above 10.0 $kJ/m^2$, and most preferably of above 20.0 $kJ/m^2$. Usually the NIS (+23° C.) will not be higher than 100 $kJ/m^2$, like not higher than 90 $kJ/m^2$.

Haze (when measured on injection molded 1 mm plaques in accordance with ASTM D1003) of the heterophasic polyolefin composition is preferably below 40%, more preferably below 35%, even more preferably below 30%, like below 25%. Usually haze of the inventive heterophasic polyolefin composition when measured in the described way will be above 10%, like above 15%.

The heterophasic polyolefin composition according to the present invention preferably has an Optomechanical Ability (OMA +23° C.) when based on NIS (23° C.) of more than 280 $kJMPa/m^2$, more preferably of more than 300 $kJMPa/m^2$, even more preferably of more than 800 $kJMPa/m^2$.

Preferably, the heterophasic polyolefin composition has an Optomechanical Ability (OMA +23° C.) of not more than 4000 $kJMPa/m^2$, more preferably of not more than 3500 $kJMPa/m^2$.

The heterophasic polyolefin composition according to the present invention preferably has an Optomechanical Ability (OMA 0° C.) when based on NIS (0° C.) of more than 50 $kJMPa/m^2$, more preferably of more than 80 $kJMPa/m^2$, even more preferably of more than 100 $kJMPa/m^2$. Preferably, the heterophasic polyolefin composition has an Optomechanical Ability (OMA +23° C.) of not more than 2500 $kJMPa/m^2$, and most preferably of not more than 2000 $kJMPa/m^2$.

Typically, the polyolefin composition will show two melting temperatures $T_{m1}$ and $T_{m2}$ in differential scanning calorimetry (DSC) due to its heterophasic nature and the two components present therein. The propylene butene random copolymer (A) has a higher melting temperature than the copolymer of ethylene (B). Preferably, all melting temperatures for the composition of the invention are lower than 152° C. In general, the upper melting temperature $T_{m1}$ (i.e. of the propylene butene random copolymer (A)) may be in the range of lower than 152° C., more preferably of lower than 148° C. A typical range for $T_{m1}$ would be 130 to 150° C., preferably 136 to 148° C. The lower melting temperature $T_{m2}$ (i.e. of the copolymer of ethylene (B)) may be in the range of lower than 135° C., preferably lower than 130° C., and most preferably lower than 125° C. A typical range for $T_{m2}$ would be 110 to 130° C., preferably 115 to 125° C. Also, the polyolefin composition will preferably show a crystallization temperature in DSC $T_c$ in the range of 100 to 125° C., like in the range of 104 to 120° C.

Equally preferably, the polyolefin composition will have a xylene soluble content (XCS) of less than 5.0 wt.-%, more preferably in the range of 0.5 to 3.5 wt.-%.

Preferably, the propylene butene random copolymer (A) and the copolymer of ethylene (B) are the sole polymer components in the heterophasic polyolefin composition. However, it is to be understood herein that the heterophasic polyolefin composition may comprise further components such as additives, which may optionally be added in a mixture with a carrier polymer, i.e. in so-called master batches. Therefore, in case the heterophasic polyolefin composition has been produced with the help of master batches, the propylene butene random copolymer (A), the copolymer of ethylene (B) and the carrier polymer are preferably the sole polymer components in the heterophasic polyolefin composition.

Therefore, one or more additives known in the art of polymer processing can also be included in the composition. Suitable additives include fillers, lubricants, processing aids, antioxidants, UV absorbers, light stabilisers, nucleating agents, foaming or blowing agents, clarifiers and pigments. In a particularly preferred embodiment of the invention, the heterophasic polyolefin composition comprises a nucleating agent, preferably an in-reactor nucleated polypropylene (C). In this case, the propylene butene random copolymer (A), the copolymer of ethylene (B) and the in-reactor nucleated polypropylene (C) are preferably the sole polymer components in the heterophasic polyolefin composition.

Optionally, the heterophasic polyolefin composition further comprises a soluble nucleating agent as a clarifier. The soluble nucleating agent according the present invention may be selected from the group consisting of sorbitol derivatives, e.g. di(alkylbenzylidene)sorbitols as 1,3:2,4-dibenzylidene sorbitol, 1,3:2,4-di(4-methylbenzylidene) sorbitol, 1,3:2,4-di(4-ethylbenzylidene) sorbitol and 1,3:2, 4-Bis(3,4-dimethylbenzylidene) sorbitol, as well as nonitol derivatives, e.g. 1,2,3-trideoxy-4,6;5,7-bis-O-[(4-propylphenyl)methylene]nonitol, and benzene-trisamides like substituted 1,3,5-benzenetrisamides as N,N',N''-tris-tert-butyl-1,3,5-benzenetricarboxamide, N,N',N''-tris-cyclohexyl-1,3,5-benzene-tricarboxamide and N-[3,5-bis-(2,2-dimethyl-propionylamino)-phenyl]-2,2-dimethyl-propionamide, wherein 1,3:2,4-Bis(3,4-dimethylbenzylidene) sorbitol and N-[3,5-bis-(2,2-dimethyl-propionylamino)-phenyl]-2,2-dimethyl-propionamide are equally preferred, and 1,3:2,4-Bis(3,4-dimethylbenzylidene). Most preferably, the nucleating agent comprised in the heterophasic polyolefin composition is sorbitol.

The additives may be present in amounts in the range of 0.1 to 10.0 wt.-%, preferably in the range of 0.3 to 5.0 wt.-%, more preferably in the range of 0.5 to 3.0 wt.-% relative to the total weight of the heterophasic polyolefin composition as a whole.

The heterophasic polyolefin composition of the present invention comprises a propylene butene random copolymer (A) and a copolymer of ethylene (B).

The propylene butene random copolymer (A) is present in the range 55 to 95 wt.-%, preferably of from 58 to 93 wt.-%, more preferably of from 60 to 91 wt.-%, and most preferably of from 65 to 85 wt.-% of the heterophasic polyolefin composition, wherein said wt.-% values are relative to the total weight of the composition as a whole.

The copolymer of ethylene (B) may be present in the range 5 to 45 wt.-%, preferably of from 7 to 42 wt.-%, even more preferably of from 9 to 40 wt.-%, and most preferably of from 15 to 35 wt.-% of the heterophasic polyolefin composition, wherein said wt.-% values are relative to the total weight of the composition as a whole.

Propylene Butene Random Copolymer (A)

The propylene butene random copolymer (A) is a propylene copolymer. The comonomer is butene. The butene content in the propylene butene random copolymer (A) is in the range of from 1.5 to 8.0 wt.-%, more preferably of from 2.0 to 7.0 wt.-%, and even more preferably of from 2.5 to 5.0 wt.-%. The propylene butene random copolymer (A) is produced using a single-site catalyst. Preferably, the propylene butene random copolymer (A) is produced using a single-site catalyst according to the preferred embodiments as disclosed in the preparation section of the propylene butene random copolymer (A) as provided herein.

Preferably, propylene and butene are the only monomers present in the propylene butene random copolymer (A), i.e. butene is the only comonomer. It is especially preferred if the propylene butene random copolymer (A) is substantially free of ethylene, e.g. comprises less than 0.1 wt.-% ethylene, preferably less than 0.05 wt.-% ethylene, and more preferably less than 0.01 wt.-%.

If present, comonomers different from butene may be ethylene or $C_{5-12}$, preferably $C_{5-10}$, alpha olefin comonomers, particularly singly or multiply ethylenically unsaturated comonomers, in particular $C_{5-10}$ alpha olefins such as hex-1-ene, oct-1-ene, and 4-methyl-pent-1-ene. 1-hexene and 1-octene are preferred.

The propylene butene random copolymer (A) is preferably multimodal. More preferably, the polypropylene is bimodal, i.e. consists of two fractions, each comprising a polypropylene polymer (A1) and (A2).

The propylene butene random copolymer (A) has a melt flow rate $MFR_2$ (230° C.) of 0.3 to 100 g/10 min, preferably of from 0.8 to 20.0 g/10 min, more preferably of 1.0 to 10.0 g/10 min.

The density of the polypropylene is preferably in the range of from 890 to 907 kg/m³, more preferably of from 900 to 905 kg/m³.

Preferably, the propylene butene random copolymer (A) has a flexural modulus of at least 850 MPa, more preferably of at least 900 MPa, and most preferably of at least 950 MPa. Also preferably, the copolymer has a flexural modulus of less than 1600 MPa, more preferably less than 1400 MPa.

The propylene butene random copolymer (A) preferably has a molecular weight distribution $M_w/M_n$, being the ratio of the weight average molecular weight $M_w$ and the number average molecular weight $M_n$, in the range of 2.0 to 4.5, preferably of 2.5 to 4.0.

The propylene butylene random copolymer preferably has a crystallisation temperature $T_c$ of more than 95° C., more preferably from 100° C. to 120° C. and most preferably from 105° C. to 115° C.

Preferably, the propylene butene random copolymer (A) has a xylene soluble content (XCS) of less than 6.0 wt.-%, more preferably at most 5.0 wt.-%, even more preferably at most 4.0 wt.-%, and most preferably at most 3.0 wt.-%. A preferable lower limit for the XCS is 0.1 wt.-%, even more preferably 0.2 wt.-%.

As noted above, the propylene butene random copolymer (A) preferably is multimodal. Hence, it comprises at least two fractions each comprising a polypropylene butene copolymer (A1) and (A2). In one particularly preferably embodiment, the propylene butene random copolymer (A) consists of propylene butene copolymers (A1) and (A2). The weight ratio of propylene butene copolymer (A1) to propylene butene copolymer (A2) in the propylene butene random copolymer (A) is in the range of from 30:70 to 70:30, more preferably of from 35:65 to 65:35, most preferably of from 40:60 to 60:40. In some further preferred embodiments the ratio is of from 45 to 55 wt.-% of propylene butene copolymer (A1) and 55 to 45 wt.-% of propylene butene copolymer (A2), most preferably 50 wt.-% of propylene butene copolymer (A1) and 50 wt.-% of propylene butene copolymer (A2).

It is a requirement of the invention that propylene butene copolymers (A1) and (A2) are different.

Propylene Butene Copolymer (A1)

Propylene butene copolymer (A1) consists of a single propylene butene copolymer. The comonomer is butene. The butene content in propylene butene copolymer (A1) is in the range of from 0.5 to 12.0 wt.-% relative to the total weight of the propylene butene copolymer (A1), preferably of from 1.0 to 8.0 wt.-%, more preferably of from 2.0 to 6.0 wt.-%, like from 2.8 to 6.0 wt.-%. The propylene butene copolymer (A1) is produced using a single-site catalyst. Preferably, the propylene butene copolymer (A1) is produced using a single-site catalyst according to the preferred embodiments as disclosed in the preparation section of the propylene butene random copolymer (A) as provided herein.

The propylene butene copolymer (A1) has a melt flow rate $MFR_2$ (230° C.) of 0.3 to 100 g/10 min, preferably of from 0.5 to 20.0 g/10 min.

The propylene butene copolymer (A1) is present in the propylene butene random copolymer (A) in an amount of from 30 to 70 wt.-%, preferably of from 35 to 65 wt.-%, more preferably of from 40 to 60 wt.-%, most preferably of from 45 to 55 wt.-%.

Propylene Butene Copolymer (A2)

Propylene butene copolymer (A2) consists of a single propylene butene copolymer. The comonomer is butene. The butene content in the propylene butene copolymer (A2) is in the range of from 0.5 to 10.0 wt.-% relative to the total weight of the propylene butene copolymer (A2), preferably of from 0.8 to 8.0 wt.-%, more preferably of from 1.0 to 6.0 wt.-%, like from 1.0 to 4.9 wt.-%. It is especially preferred that the comonomer content of the propylene butene copolymer (A2) is less than the comonomer content of propylene butene copolymer (A1). The propylene butene copolymer (A2) is produced using a single-site catalyst. Preferably, the propylene butene copolymer (A2) is produced using a single-site catalyst according to the preferred embodiments as disclosed in the preparation section of the propylene butene random copolymer (A) as provided herein.

The propylene butene copolymer (A2) has a melt flow rate $MFR_2$ of 0.3 to 100 g/10 min, preferably of from 0.5 to 20.0 g/10 min.

The propylene butene copolymer (A2) is present in the propylene butene random copolymer (A) in an amount of from 70 to 30 wt.-%, preferably of from 65 to 35 wt.-%, more preferably of from 60 to 40 wt.-%, even more preferably of from 55 to 45 wt.-%.

Copolymer of Ethylene (B)

The copolymer of ethylene (B) as comprised in the heterophasic composition of the present invention is a copolymer of ethylene with at least two different comonomers selected from alpha-olefins having from 4 to 10 carbon atoms, which has an $MFR_2$ (190° C.) of 0.5 to 10 g/10 min and a density in the range of 910 to 935 kg/m³. The copolymer of ethylene (B) is produced in a process using a single-site catalyst. Preferably, the copolymer of ethylene (B) is produced using a single-site catalyst according to the preferred embodiments as disclosed in the preparation section of the copolymer of ethylene (B) as provided herein.

Preferably, the copolymer of ethylene (B) is a multimodal polymer comprising ethylene polymer (B1) and ethylene polymer (B2). Preferably, the $MFR_2$ of the ethylene polymer (B1) is different from the $MFR_2$ of the ethylene polymer (B2).

Preferably, the at least two alpha-olefin comonomers having from 4 to 10 carbon atoms of the copolymer of ethylene (B) are preferably 1-butene and 1-hexene.

The copolymer of ethylene (B) is a linear low density polyethylene (LLDPE) which has a well-known meaning, more preferably having a density in the range of 912 to 925 kg/m³.

Preferably, the copolymer of ethylene (B) has an Mw/Mn between 2.5 and 4.8, more preferably 3.0 and <4.5, and most preferably between 3.5 and 4.2.

Preferably, the $MFR_2$ (190° C.) of the copolymer of ethylene (B), is of 0.6 to 7.0 g/10 min, more preferably of 0.7 to 5.0 g/10 min. Preferably, the copolymer of ethylene (B) has a ratio $MFR_{21}/MFR_2$ of 13 to 35, more preferably of 13 to 30, even more preferably of 15 to 30, and most preferably of 15 to 25.

More preferably, the total amount of comonomers present in the copolymer of ethylene (B) is of 0.5 to 10 mol-%, preferably of 1.0 to 8 mol-%, more preferably of 1.0 to 5 mol-%, more preferably of 1.5 to 5.0 mol-%.

It is noted herein, that the copolymer of ethylene (B) may optionally comprise a prepolymer component in an amount up to 20 wt.-% which has a well-known meaning in the art. In such case the prepolymer component is calculated in the amount of one of the ethylene polymers (B1) or (B2), preferably in the amount of the ethylene polymer (B1), based on the total amount of the copolymer of ethylene (B).

The term 'multimodal' in context of the copolymer of ethylene (B) means herein multimodality with respect to melt flow rate (MFR) of the ethylene polymers (B1) and (B2), i.e. the ethylene polymers (B1) and (B2) have different MFR values. The copolymer of ethylene (B) can have further multimodality with respect to one or more further properties between the ethylene polymers (B1) and (B2), as will be described later below.

Preferably, the copolymer of ethylene (B) comprises the ethylene polymer (B1) in an amount of 30 to 70 wt.-%, preferably of 32 to 60 wt.-%, more preferably of 35 to 55 wt.-% and even more preferably of 40 to 50 wt.-% and the ethylene polymer (B2) in an amount of 70 to 30 wt.-%, preferably of 68 to 40 wt.-%, more preferably of 45 to 65 wt.-%, more preferably 50 to 60 wt.-%, based on the total amount (100 wt.-%) of the copolymer of ethylene (B). Most preferably, the copolymer of ethylene (B) consists of the ethylene polymers (B1) and (B2) as the sole polymer components. Accordingly, the split between ethylene polymer (B1) and ethylene polymer (B2) is of (30 to 70):(70 to 30), preferably of (32 to 60):(68 to 40), more preferably of (35 to 55):(65 to 45), more preferably of (40 to 50):(50 to 60).

Ethylene Polymer (B1)

Preferably, the ethylene polymer (B1) has a $MFR_2$ (190° C.) of 1 to 50 g/10 min, preferably of 1 to 40 g/10 min, more preferably of 1 to 30 g/10 min, more preferably of 2 to 20 g/10 min, more preferably of 2 to 15 g/10 min, even more preferably of 2 to 10 g/10 min. More preferably, the ethylene polymer (B1) has a higher $MFR_2$ than the ethylene polymer (B2).

Even more preferably, the ratio of the $MFR_2$ (190° C.) of ethylene polymer (B1) to the $MFR_2$ (190° C.) of the copolymer of ethylene (B) is in the range of 1.0 to 50, preferably 1.5 to 40, more preferably 1.8 to 30, even more preferably 2.0 to 25, and most preferably 2.0 to 10.

Relationship Between Ethylene Polymers (B1) and (B2)

If the $MFR_2$ (190° C.) of ethylene polymers, e.g. (B2), cannot be measured, because it cannot be isolated from the mixture of at least the ethylene polymers (B1) and (B2), it can be calculated ($MI_2$ below) using the so called Hagström equation (Hagström, The Polymer Processing Society, Europe/Africa Region Meeting, Gothenburg, Sweden, Aug. 19-21, 1997):

$$MI_b = \left( w \cdot MI_1^{-\frac{w-b}{a}} + (1-w) \cdot MI_2^{-\frac{w-b}{a}} \right)^{-a \cdot w^b} \quad \text{equation (1)}$$

According to said Hagström, in said equation (1), a=5.2 and b=0.7 for $MFR_2$. Furthermore, w is the weight fraction of the other ethylene polymer, e.g. (B1), having higher MFR. The ethylene polymer (B1) can thus be taken as the component 1 and the ethylene polymer (B2) as the component 2. $MI_b$ is the $MFR_2$ of the copolymer of ethylene (B). The $MFR_2$ of the ethylene polymer (B2) ($MI_2$) can then be solved from equation 1 when the $MFR_2$ of the ethylene polymer (B1) ($MI_1$) and the copolymer of ethylene (B) ($MI_b$) are known.

Naturally, in addition to multimodality with respect to, i.e. difference between, the MFR of the ethylene polymers (B1) and (B2), the copolymer of ethylene (B) of the polymer composition of the invention can also be multimodal e.g. with respect to one or both of the two further properties:

multimodality with respect to, i.e. difference between,
the comonomer type or the comonomer content(s) present in the ethylene polymers (B1) and (B2), or both the type and content(s) of comonomers present in the ethylene polymers (B1) and (B2); and/or the density of the ethylene polymers (B1) and (B2).

Preferably, the copolymer of ethylene (B) of the polymer composition of the invention is further multimodal with respect to the comonomer type and/or the comonomer content (mol-%), preferably the alpha-olefin comonomer having from 4 to 10 carbon atoms of the ethylene polymer (B1) is different from the alpha-olefin comonomer having from 4 to 10 carbon atoms of the ethylene polymer (B2), preferably the alpha-olefin comonomer having from 4 to 10 carbon atoms of the ethylene polymer (B1) is 1-butene and the alpha-olefin comonomer having from 4 to 10 carbon atoms of ethylene polymer (B2) is 1-hexene.

Preferably, the ratio of [the amount (mol-%) of alpha-olefin comonomer having from 4 to 10 carbon atoms comonomer present in ethylene polymer (B1)] to [the amount (mol-%) of at least two alpha-olefin comonomers having from 4 to 10 carbon atoms of the copolymer of ethylene (B) is of 0.1 to 0.6, preferably of 0.1 to 0.4, more preferably the ethylene polymer (B1) has lower amount (mol-%) of comonomer than the ethylene polymer (B2).

The comonomer content of ethylene polymers (B1) and (B2) can be measured, or, in case, and preferably, one of the components is produced first and the other thereafter in the presence of the first produced in so called multistage process, then the comonomer content of the first produced component, e.g. component (B1), can be measured and the comonomer content of the other component, e.g. component (B2), can be calculated according to following formula:

Comonomer content(mol-%) in (B2)=(comonomer content(mol-%) in (B)−(weight fraction of(B1) *comonomer content(mol-%) in (B1)))/(weight fraction of(B2))

Preferably, the amount (mol-%) of alpha-olefin comonomer having from 4 to 10 carbon atoms present in the ethylene polymer component (B1) is of 0.03 to 5.0 mol-%, preferably of 0.05 to 4.0 mol-%, more preferably of 0.1 to 3.0 mol-%, even more preferably of 0.1 to 2.0 mol-%, more preferably of 0.15 to 1.5 mol-%, even more preferably of 0.15 to 1.0 mol-%.

In an embodiment, the amount (mol-%) of alpha-olefin comonomer having from 4 to 10 carbon atoms, preferably 1-hexene, present in the ethylene polymer (B2) may be of 0.3 to 10.0 mol-%, preferably of 0.5 to 9.0 mol-%, more preferably of 1.0 to 8.5 mol-%, even more preferably of 3.0 to 8.0 mol-%.

The further specific multimodality, i.e. the difference between, the comonomer type and comonomer content between the ethylene polymer (B1) and the ethylene polymer (B2) further contributes to advantageous optical properties, like haze.

Even more preferably, the copolymer of ethylene (B) of the polymer composition is further multimodal with respect to difference in density between the ethylene polymer (B1) and ethylene polymer (B2). Preferably, the density of ethylene polymer (B1) is different, preferably higher, further preferred >41 kg/m³ higher, even further preferred >42 kg/m³ higher, most preferred >42.5 kg/m³ higher, than the density of the ethylene polymer (B2). More preferably, the density of the ethylene polymer (B1) is of 925 to 950 kg/m³, preferably of 930 to 945 kg/m³ and/or the density of ethylene polymer (B2) is of 880 to <910 kg/m³, preferably of 890 to 905 kg/m³.

The multimodality with respect to density further contributes to the beneficial mechanical properties of the polymer composition.

Additionally, the copolymer of ethylene (B) of the polymer composition of the present invention can also be multimodal with respect to, i.e. have difference between, the (weight average) molecular weight of the ethylene polymers (B1) and (B2). The multimodality re weight average molecular weight means that the form of the molecular weight distribution curve, i.e. the appearance of the graph of the polymer weight fraction as function of its molecular weight, of such a multimodal polyethylene will show two or more maxima or at least be broadened distinctly in comparison to the curves for the individual components.

More preferably the copolymer of ethylene (B) is multimodal at least with respect to, i.e. has a difference between, the $MFR_2$, the comonomer type and the comonomer content (mol-%), as well as with respect to, i.e. has a difference between, the density of the ethylene polymer (B1) and ethylene polymer (B2), as defined above, below or claims including any of the preferable ranges or embodiments of the polymer composition.

Most preferably the polymer composition of the invention, as defined herein, comprises a copolymer of ethylene (B) comprising, preferably consisting of, an ethylene polymer (B1) and an ethylene polymer (B2), wherein the ethylene polymer (B1) has a higher $MFR_2$ than the ethylene polymer (B2);
more preferably, the ethylene polymer (B1) has an $MFR_2$ of 1.0 to 50 g/10 min, preferably of 1.0 to 40 g/10 min, more preferably of 1.0 to 30 g/10 min, more preferably of 2.0 to 20 g/10 min, more preferably of 2.0 to 15 g/10 min, even more preferably of 2.0 to 10 g/10 min;
even more preferably, the ratio of the $MFR_2$ of ethylene polymer (B1) to the $MFR_2$ of the copolymer of ethylene (B) is of 1 to 50, preferably of 1.5 to 40, preferably of 1.8 to 30, more preferably of 2.0 to 25, more preferably of 2 to 10;

and wherein the ethylene polymer (B1) has a different comonomer than the ethylene polymer (B2);
more preferably, the ethylene polymer (B1) has a lower amount (mol-%) of comonomer than the ethylene polymer (B2), even more preferably, the ratio of [the amount (mol-%) of alpha-olefin comonomer having from 4 to 10 carbon atoms comonomer present in ethylene polymer (B1)] to [the amount (mol-%) of at least two alpha-olefin comonomers having from 4 to 10 carbon atoms of the copolymer of ethylene (B) is of 0.1 to 0.6, preferably of 0.1 to 0.4;
even more preferably, wherein the alpha-olefin comonomer having from 4 to 10 carbon atoms of ethylene polymer (B1) is 1-butene and the alpha-olefin comonomer having from 4 to 10 carbon atoms of ethylene polymer (B2) is 1-hexene;

and wherein the ethylene polymer (B1) has different, preferably higher, density than the density of the ethylene polymer (B2); more preferably the density of the copolymer of ethylene (B) is of 910 to 935 kg/m³, preferably of 912 to 925 kg/m³; even more preferably the density of the ethylene polymer (B1) is of 925 to 950 kg/m³, preferably of 930 to 945 kg/m³.

In-Reactor Nucleated Polypropylene (C)

The optional in-reactor nucleated polypropylene (C) is a polymer produced with a specifically pre-polymerized Ziegler-Natta type catalyst as defined for example in EP 2 960 279 A1. Said in-reactor nucleated polypropylene (C) is characterized by a melting point (DSC) in the range of 155 to 170° C., and preferably by a melt flow rate $MFR_2$ (230° C.) in the range of 0.3 to 30 g/10 min.

Preparation of the Heterophasic Polyolefin Composition

The heterophasic polyolefin composition of the invention may be prepared by any suitable method. Ideally, a method is used which produces a homogenous mixture of the various components. Typically, compounding is employed. Compounding usually involves mixing or/and blending the various components in a molten state, often by extrusion.

Preparation of the Propylene Butene Random Copolymer (A)

The propylene butene random copolymer (A) may be prepared by any known process in the art, such as by blending the two propylene butene copolymers (A1) and (A2). However, preferably, the propylene butene random copolymer (A) is produced in a multistage process wherein propylene butene copolymers (A1) and (A2) are produced in subsequent stages. The properties of the propylene butene copolymer (A2) produced in a higher stage of the multistage process may be calculated as follows.

The $MFR_2$ of the propylene butene copolymer (A2), produced in the second reactor is determined according to equation (2):

$$\log(MFR(A2)) = \frac{\log(MFR(A)) - w(A1) * \log(MFR(A1))}{w(A2)} \quad \text{equation (2)}$$

wherein
- MFR(A) is the $MFR_2$ of the propylene butene random copolymer (A)
- w(A1) and w(A2) are the weight fractions of the propylene butene copolymers (A1) and (A2) in the propylene butene random copolymer (A)
- MFR(A1) is the $MFR_2$ of the propylene butene copolymer (A1) produced in the first reactor.

Thus, although not directly measurable on the multistage process products, the properties of the propylene butene copolymers produced in higher stages of such a multistage processes may be determined by applying the above method.

Multimodal propylene copolymers produced in a multistage process are also designated as 'in-situ' blends. The resulting end product consists of an intimate mixture of the polymers from the two or more reactors. These two polymers may have different molecular-weight-distribution curves, and/or they may differ in terms of comonomer content or type. The end product thus contains a mixture or two or more polymers with differing properties, i.e. it is a multimodal polymer mixture In a particularly preferred embodiment, the multimodal propylene copolymer is prepared by a process comprising:
(i) polymerising propylene and butene in a first polymerisation stage in the presence of a single site catalyst to prepare a first propylene butene copolymer having a $MFR_2$ from 0.5 to 150.0 g/10 min and a butene content of 0.5 to 10.0 wt.-%;
(ii) polymerising propylene and butene in a second polymerisation stage in the presence of said catalyst and said first propylene butene copolymer to prepare said multimodal propylene butene copolymer.

The first polymerisation stage is preferably a slurry polymerisation step. The slurry polymerisation usually takes place in an inert diluent, typically a hydrocarbon diluent such as methane, ethane, propane, n-butane, isobutane, pentanes, hexanes, heptanes, octanes etc., or their mixtures. Preferably, the diluent is a low-boiling hydrocarbon having from 1 to 4 carbon atoms or a mixture of such hydrocarbons. An especially preferred diluent is propane, possibly containing minor amount of methane, ethane and/or butane.

The temperature in the first polymerisation stages is typically from 60 to 100° C., preferably from 70 to 90° C. An excessively high temperature should be avoided to prevent partial dissolution of the polymer into the diluent and the fouling of the reactor. The pressure is from 1 to 150 bar, preferably from 40 to 80 bar.

The slurry polymerisation may be conducted in any known reactor used for slurry polymerisation. Such reactors include a continuous stirred tank reactor and a loop reactor. It is especially preferred to conduct the polymerisation in a loop reactor. In such reactors the slurry is circulated with a high velocity along a closed pipe by using a circulation pump. Loop reactors are generally known in the art and examples are given, for instance, in U.S. Pat. Nos. 4,582,816, 3,405,109, 3,324,093, EP-A-479186 and U.S. Pat. No. 5,391,654. It is thus preferred to conduct the first polymerisation stage as a slurry polymerisation in a loop reactor.

The slurry may be withdrawn from the reactor either continuously or intermittently. A preferred way of intermittent withdrawal is the use of settling legs where slurry is allowed to concentrate before withdrawing a batch of the concentrated slurry from the reactor. The use of settling legs is disclosed, among others, in U.S. Pat. Nos. 3,374,211, 3,242,150 and EP-A-1310295. Continuous withdrawal is disclosed, among others, in EP-A-891990, EP-A-1415999, EP-A-1591460 and WO-A-2007/025640. The continuous withdrawal is advantageously combined with a suitable concentration method, as disclosed in EP-A-1310295 and EP-A-1591460. It is preferred to withdraw the slurry from the first polymerisation stage continuously.

Hydrogen is typically introduced into the first polymerisation stage for controlling the $MFR_2$ of the propylene butene random copolymer (A). The amount of hydrogen needed to reach the desired $MFR_2$ depends on the catalyst used and the polymerisation conditions, as will be appreciated by the skilled worker.

The average residence time in the first polymerisation stage is typically from 20 to 120 minutes, preferably from 30 to 80 minutes. As it is well known in the art the average residence time T can be calculated from equation (3) below:

$$\tau = \frac{V_R}{Q_o} \quad \text{equation (3)}$$

wherein
- $V_R$ is the volume of the reaction space (in case of a loop reactor, the volume of the reactor, in case of the fluidized bed reactor, the volume of the fluidized bed)
- $Q_o$ is the volumetric flow rate of the product stream (including the polymer product and the fluid reaction mixture).

The production rate is suitably controlled with the catalyst feed rate. It is also possible to influence the production rate by suitable selection of the monomer concentration. The desired monomer concentration can then be achieved by suitably adjusting the propylene feed rate.

The second polymerisation stage is preferably a gas phase polymerisation step, i.e. carried out in a gas-phase reactor. Any suitable gas phase reactor known in the art may be used, such as a fluidised bed gas phase reactor.

For gas phase reactors, the reaction temperature used will generally be in the range 60 to 115° C. (e.g. 70 to 110° C.), the reactor pressure will generally be in the range 10 to 25 bar, and the residence time will generally be 1 to 8 hours. The gas used will commonly be a non-reactive gas such as nitrogen or low boiling point hydrocarbons such as propane together with monomer (e.g. ethylene).

A chain transfer agent (e.g. hydrogen) is typically added to the second polymerisation stage.

The split between the first and second polymerisation stages may be in the range 30:70 to 70:30, preferably 40:60 to 60:40, such as 45:55 to 55:45, for example 50:50.

A preferred multistage process is the above-identified slurry-gas phase process, such as developed by Borealis and known as the Borstar® technology. In this respect, reference is made to the EP applications EP 0 887 379 A1 and EP 0517868 A1.

The polymerisation steps discussed above may be preceded by a prepolymerisation step. The purpose of the prepolymerisation is to polymerise a small amount of polymer onto the catalyst at a low temperature and/or a low monomer concentration. By prepolymerisation it is possible to improve the performance of the catalyst in slurry and/or modify the properties of the final polymer. The prepolymerisation step is typically conducted in slurry.

Thus, the prepolymerisation step may be conducted in a loop reactor. The prepolymerisation is then preferably conducted in an inert diluent, typically a hydrocarbon diluent such as methane, ethane, propane, n-butane, isobutane, pentanes, hexanes, heptanes, octanes etc., or their mixtures. Preferably the diluent is a low-boiling hydrocarbon having from 1 to 4 carbon atoms or a mixture of such hydrocarbons.

The temperature in the prepolymerisation step is typically from 0 to 90° C., preferably from 20 to 80° C. and more preferably from 55 to 75° C.

The pressure is not critical and is typically from 1 to 150 bar, preferably from 40 to 80 bar.

The amount of monomer is typically such that from 0.1 to 1000 grams of monomer per one gram of solid catalyst component is polymerised in the prepolymerisation step. As the person skilled in the art knows, the catalyst particles recovered from a continuous prepolymerisation reactor do not all contain the same amount of prepolymer. Instead, each particle has its own characteristic amount which depends on the residence time of that particle in the prepolymerisation reactor. As some particles remain in the reactor for a relatively long time and some for a relatively short time, then also the amount of prepolymer on different particles is different and some individual particles may contain an amount of prepolymer which is outside the above limits. However, the average amount of prepolymer on the catalyst typically is within the limits specified above.

The molecular weight of the prepolymer may be controlled by hydrogen as it is known in the art. Further, antistatic additives may be used to prevent the particles from adhering to each other or the walls of the reactor, as disclosed in WO-A-96/19503 and WO-A-96/32420.

The catalyst components are preferably all introduced to the prepolymerisation step when a prepolymerisation step is present. However, where the solid catalyst component and the cocatalyst can be fed separately it is possible that only a part of the cocatalyst is introduced into the prepolymerisation stage and the remaining part into subsequent polymerisation stages. Also in such cases it is necessary to introduce so much cocatalyst into the prepolymerisation stage that a sufficient polymerisation reaction is obtained therein.

It is understood within the scope of the invention, that the amount of polymer produced in the prepolymerisation typically lies within 1.0-5.0 wt.-% in respect to the final multimodal propylene butene copolymer.

The multimodal propylene butene random copolymer is prepared in the presence of a single site catalyst (which term encompasses a metallocene and a non-metallocene catalyst). These terms have a well-known meaning. Most preferably, the catalyst is a metallocene Any metallocene catalyst capable of catalysing the formation of an olefinic polymer can be used. A suitable metallocene catalyst comprises a metallocene/activator reaction product impregnated in a porous support at maximum internal pore volume. The catalyst complex comprises a ligand which is typically bridged, and a transition metal of group IVa to VIa, and an organoaluminium compound. The catalytic metal compound is typically a metal halide.

Suitable metallocene compounds are those which have a formula $(Cp)_m R_n MR'_o X_p$, where Cp is an unsubstituted or substituted and/or fused homo or heterocyclopentadienyl, R is a group having 1-4 atoms and bridging two Cp rings, M is a transition metal of group 4, 5 or 6 in the Periodic Table of Elements (IUPAC, 1985), R' is $C_1$-$C_2$ hydrocarbyl or hydrocarboxy group and X is a halogen atom, wherein m is 1-3, n is 0 or 1, o is 0-3 and p is 0-3 and sum n+o+p corresponds the oxidation state of the transition metal M. The transition metal M is preferably zirconium, hafnium or titanium, most preferably zirconium.

Examples of suitable metallocene compounds include those of formula (I) or (II):

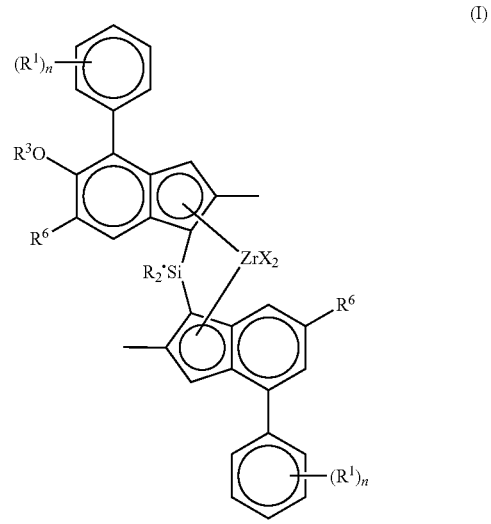

-continued

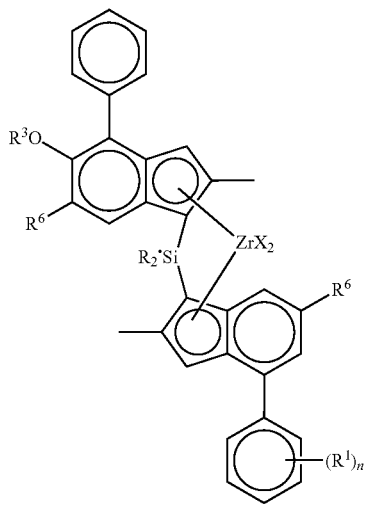

(II)

wherein each X is a sigma ligand, preferably each X is independently a hydrogen atom, a halogen atom, $C_{1-6}$-alkoxy group, $C_{1-6}$-alkyl, phenyl or benzyl group;

R' is independently a $C_{1-6}$ alkyl or $C_{3-10}$ cycloalkyl;

$R^1$ is independently $C_{3-8}$ alkyl;

$R^6$ is hydrogen or a $C_{3-8}$ alkyl group;

$R^{6'}$ is a $C_{3-8}$ alkyl group or $C_{6-10}$ aryl group, preferably a tertiary $C_{4-8}$ alkyl group;

$R^{3'}$ is a $C_{1-6}$ alkyl group, or $C_{6-10}$ aryl group optionally substituted by one or more halo groups; and n is independently 0, 1 or 2.

Particular metallocene compounds include:

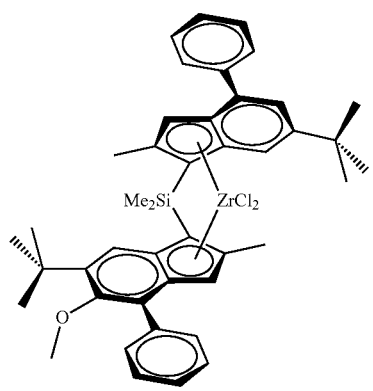

rac-anti-Me$_2$Si(2-Me-4-Ph-6-tBu-Ind)(2-Me-4-Ph-5-OMe-6-tBu-Ind)ZrCl$_2$

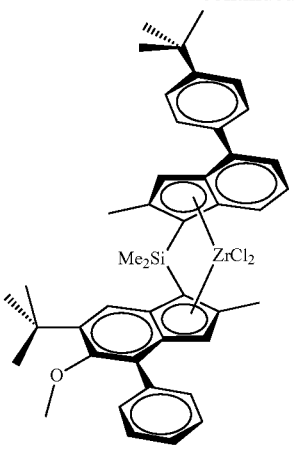

rac-anti-Me$_2$Si(2-Me-4-(p-tBuPh)-Ind)(2-Me-4-Ph-5-OMe-6-tBu-Ind)ZrCl$_2$

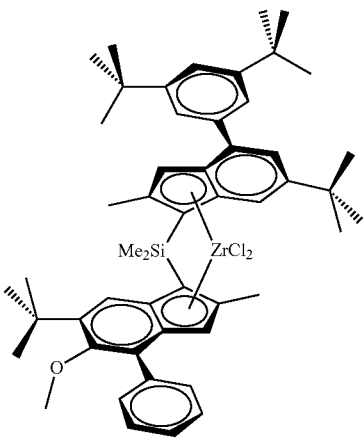

rac-anti-Me$_2$Si(2-Me-4-(3,5-di-tBuPh)-6-tBu-Ind)(2-Me-4-Ph-5-OMe-6-tBu-Ind)ZrCl$_2$

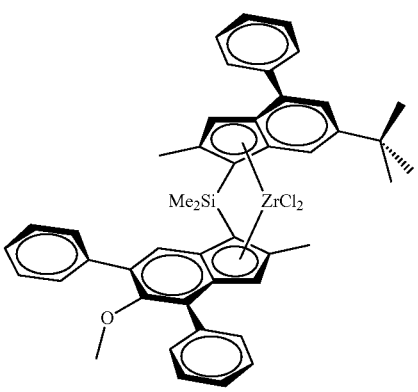

rac-anti-Me$_2$Si(2-Me-4-Ph-6-tBu-Ind)(2-Me-4,6-di-Ph-5-OMe-Ind)ZrCl$_2$

17
-continued
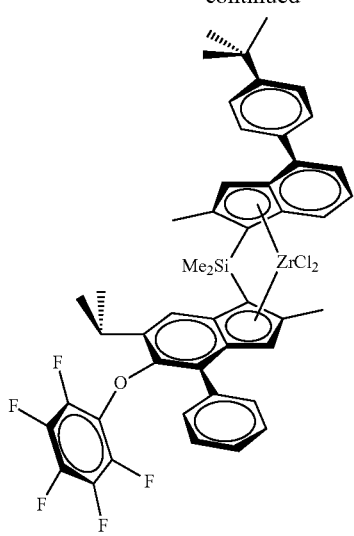
rac-anti-Me₂Si(2-
Me-4-(p-tBuPh)-
Ind)(2-Me-4-Ph-5-
OC₆F₅)-6-iPr-
Ind)ZrCl₂
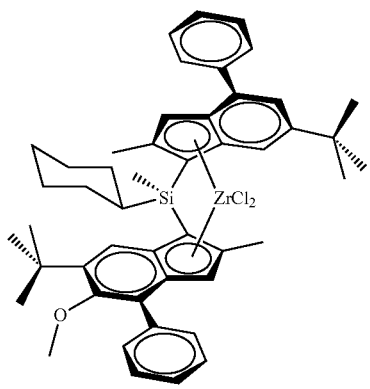
rac-anti-
Me(CyHex)Si(2-
Me-4-Ph-6-tBu-
Ind)(2-Me-4-Ph-5-
OMe-6-tBu-
Ind)ZrCl₂
18
-continued
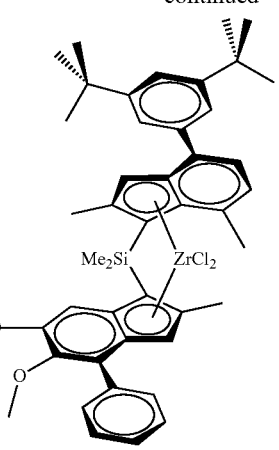
rac-anti-Me₂Si(2-Me-
4-)3,5-di-tBuPh)-7-
Me-Ind)(2-Me-4-Ph-
5-OMe-6-tBu
Ind)ZrCl₂
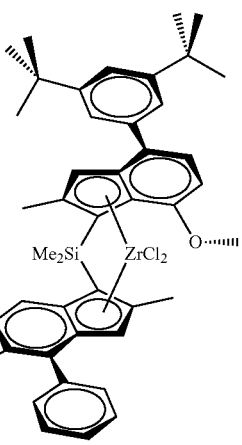
rac-anti-Me₂Si(2-
Me-4-)3,5-di-
tBuPh)-7-OMe-
Ind)(2-Me-4-Ph-5-
OMe-6-tBu
Ind)ZrCl₂

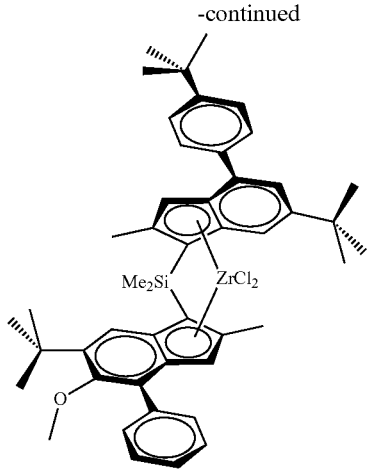

rac-anti-Me₂Si(2-
Me-4-(p-tBuPh)-
6-tBu-Ind)(2-Me-
4-Ph-5-OMe-6-
tBu-Ind)ZrCl₂

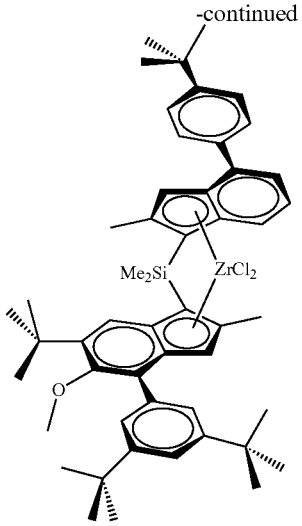

rac-anti-Me₂Si(2-Me-
4-(p-tBuPh)-Ind)(2-
Me4-(3,5-tBu2Ph)-
5-OMe-6-tBu-
Ind)ZrCl₂

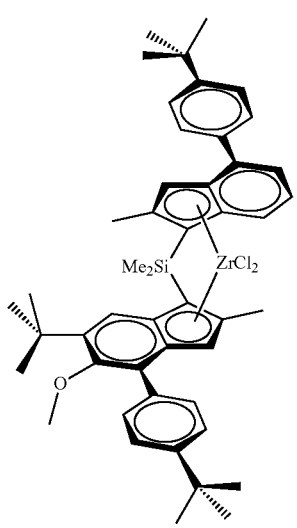

rac-anti-Me₂Si(2-
Me-4-(p-tBuPh)-
Ind)(2-Me-4-(4-
tBuPh-5-OMe-6-
tBu-Ind)ZrCl₂

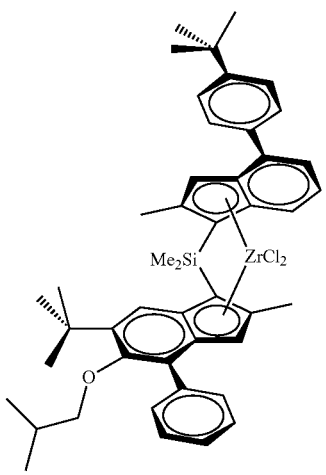

rac-anti-Me₂Si(2-
Me-4-(p-tBuPh)-
Ind)(2-Me-4-Ph-5-
OiBu-6-tBu-
Ind)ZrCl₂

Alternatively, the metallocene compound may be selected from:
rac-anti-dimethylsilanediyl[2-methyl-4,7-bis-(3',5'-dimethyl phenyl)-1,5,6,7-tetrahydro-s-indacen-1-yl][2-methyl-4-(3',5'-dimethylphenyl)-5-methoxy-6-tert-butylinden-1-yl]zirconium dichloride

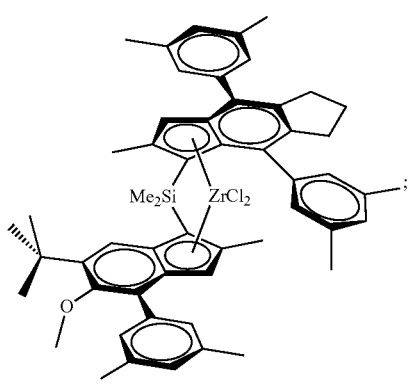

or
anti-dimethylsilanediyl[2-methyl-4-(3,5-dimethylphenyl)-5-methoxy-6-tert-butylinden-1-yl][2-methyl-4-(3,5-dimethylphenyl)-1,5,6,7-tetrahydro-s-indacen-1-yl] zirconium dichloride

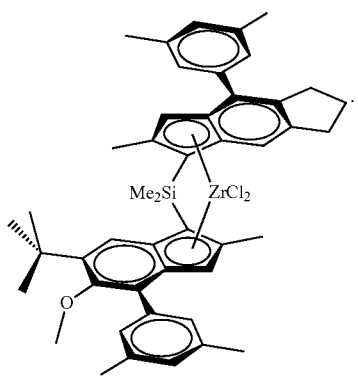

Most preferably rac-anti-Me$_2$Si(2-Me-4-(p-tBuPh)-Ind)(2-Me-4-Ph-5-OMe-6-$_t$Bu-Ind)ZrCl$_2$ is used.

Such metallocene catalysts are frequently used with catalyst activators or co-catalysts, e.g. alumoxanes such as methylaluminoxane, which are widely described in the literature.

The metallocene catalyst may be supported as is well known in the art. Any suitable support or carrier material can be used, which may be any porous, substantially inert support, such as an inorganic oxide or salt. In practice the support used is preferably a fine-grained inorganic oxide such as an inorganic oxide of an element of Group 2, 13 or 14 in the Periodic Table of Elements (IUPAC, 1985), most preferably silica, alumina or a mixture or derivative of these. Other inorganic oxides which can be used either alone or together with silica, alumina or silica-alumina, are magnesium oxide, titanium dioxide, zirconium oxide, aluminum phosphate etc.

Alternatively, the catalyst may be used in non-supported form or in solid form.

Non-supported catalyst systems, suitable for the present invention can be prepared in solution, for example in an aromatic solvent like toluene, by contacting the metallocene (as a solid or as a solution) with the cocatalyst(s), for example methylaluminoxane and/or a borane or a borate salt previously in an aromatic solvent, or can be prepared by sequentially adding the dissolved catalyst components to the polymerisation medium.

The catalyst system of the invention in solid form, preferably in solid particulate form is generally free from an external carrier, however still being in solid form. By free from an external carrier is meant that the catalyst does not contain an external support, such as an inorganic support, for example, silica or alumina, or an organic polymeric support material.

In order to provide the catalyst system of the invention in solid form but without using an external carrier, it is preferred if a liquid/liquid emulsion system is used. The process involves forming dispersing catalyst components (i) (the complex) and (ii)+optionally (iii) the cocatalysts) in a solvent, and solidifying said dispersed droplets to form solid particles. In particular, the method involves preparing a solution of the catalyst components; dispersing said solution in an solvent to form an emulsion in which said one or more catalyst components are present in the droplets of the dispersed phase; immobilising the catalyst components in the dispersed droplets, in the absence of an external particulate porous support, to form solid particles comprising the said catalyst, and optionally recovering said particles. This process enables the manufacture of active catalyst particles with improved morphology, e.g. with a predetermined particle size, spherical shape, compact structure, excellent surface properties and without using any added external porous support material, such as an inorganic oxide, e.g. silica. The catalyst particles can have a smooth surface, they may be compact in nature and catalyst active components can be distributed uniformly thorough the catalyst particles. Full disclosure of the necessary process steps can be found in, for example, WO 03/051934.

All or part of the preparation steps can be done in a continuous manner. Reference is made to WO 2006/069733 describing principles of such a continuous or semicontinuous preparation methods of the solid catalyst types, prepared via emulsion/solidification method. The formed catalyst preferably has good stability/kinetics in terms of longevity of reaction, high activity and the catalysts enable low ash contents.

The use of the heterogeneous, non-supported catalysts, (i.e. 'self-supported' catalysts) might have, as a drawback, a tendency to dissolve to some extent in the polymerisation media, i.e. some active catalyst components might leach out of the catalyst particles during slurry polymerisation, whereby the original good morphology of the catalyst might be lost. These leached catalyst components are very active possibly causing problems during polymerisation. Therefore, the amount of leached components should be minimized, i.e. all catalyst components should be kept in heterogeneous form.

Furthermore, the self-supported catalysts generate, due to the high amount of catalytically active species in the catalyst system, high temperatures at the beginning of the polymerisation which may cause melting of the product material. Both effects, i.e. the partial dissolving of the catalyst system and the heat generation, might cause fouling, sheeting and deterioration of the polymer material morphology.

In order to minimise the possible problems associated with high activity or leaching, it is preferred to 'prepolymerise' the catalyst before using it in polymerisation process. It has to be noted that prepolymerisation in this regard is part of the catalyst preparation process, being a step carried out after a solid catalyst is formed. This catalyst prepolymerisation step is not part of the actual polymerisation configuration, which might comprise a conventional process prepolymerisation step as well. After the catalyst prepolymerisation step, a solid catalyst is obtained and used in polymerisation.

Catalyst 'prepolymerisation' takes place following the solidification step of the liquid-liquid emulsion process hereinbefore described. Prepolymerisation may take place by known methods described in the art, such as that described in WO 2010/052263, WO 2010/052260 or WO 2010/052264. Use of the catalyst prepolymerisation step offers the advantage of minimising leaching of catalyst components and thus local overheating.

The solvent employed in the processes of the invention may be any solvent suitable for use in olefin polymerisation and is typically a mixture of hydrocarbons. Such solvents are well known in the art. Examples of solvents include hexane, cyclohexane, isohexane, n-heptane, C8, C9 isoparaffins and mixtures thereof.

In one embodiment, the polymerisation is carried out in the presence of hydrogen. Hydrogen is typically employed to help control polymer properties, such as polymer molecular weight. In an alternative embodiment, hydrogen is not added in step (i). The skilled worker will appreciate, however, that hydrogen may be generated during the polymerisation process. Thus, the hydrogen present in the polymerisation reaction mixture formed in step (i) of the process may originate from hydrogen which has been added as a reactant and/or hydrogen produced as a side product during polymerisation.

It will be appreciated that the propylene polymers may contain standard polymer additives. These typically form less than 5.0 wt.-%, such as less than 2.0 wt.-% of the polymer material. Additives, such as antioxidants, phosphites, cling additives, pigments, colorants, fillers, anti-static agent, processing aids, clarifiers and the like may thus be added during the polymerisation process. These additives are well known in the industry and their use will be familiar to the artisan. Any additives which are present may be added as an isolated raw material or in a mixture with a carrier polymer, i.e. in so called master batch.

In one embodiment of the invention, the process for preparing the multimodal propylene butene copolymer may further comprise a step of visbreaking. The term 'visbreaking' will be well known to the person skilled in the art and relates to a process which results in a controlled breakdown of polymer chains, leading to rheological changes, typically an increase in $MFR_2$. Thus, the multimodal polymers of the invention may be subject to visbreaking to finely tune their rheological profile, as desired. Visbreaking may take place by several methods, as are well known in the art, such as thermal pyrolysis, exposure to ionising radiation or oxidising agents. In the context of the present invention, visbreaking is typically carried out using peroxides.

Preparation of the Copolymer of Ethylene (B)

The copolymer of ethylene (B) is preferably produced using a coordination catalyst. More preferably, the ethylene polymers (B1) and (B2) of the copolymer of ethylene (B) are preferably produced using a single site catalyst, which includes metallocene catalysts and non-metallocene catalysts, which all terms have a well-known meaning in the art. Preferably, the term 'single site catalyst' means herein the catalytically active metallocene compound or complex combined with a cocatalyst. The metallocene compound or complex is referred herein also as organometallic compound (X).

The organometallic compound (X) comprises a transition metal (M) of Group 3 to 10 of the Periodic Table (IUPAC 2007) or of an actinide or lanthanide.

The term 'an organometallic compound (X)' includes any metallocene or non-metallocene compound of a transition metal which bears at least one organic (coordination) ligand and exhibits the catalytic activity alone or together with a cocatalyst. The transition metal compounds are well known in the art and the present invention covers compounds of metals from Group 3 to 10, e.g. Group 3 to 7, or 3 to 6, such as Group 4 to 6 of the Periodic Table, (IUPAC 2007), as well lanthanides or actinides.

In an embodiment the organometallic compound (X) has the following formula (III):

$$(L)_m R_n M X_q \qquad (III)$$

wherein
'M' is a transition metal (M) transition metal (M) of Group 3 to 10 of the Periodic Table (IUPAC 2007),
each 'X' is independently a monoanionic ligand, such as a σ-ligand,
each 'L' is independently an organic ligand which coordinates to the transition metal 'M',
'R' is a bridging group linking said organic ligands (L),
'm' is 1, 2 or 3, preferably 2
'n' is 0, 1 or 2, preferably 1,
'q' is 1, 2 or 3, preferably 2 and
m+q is equal to the valency of the transition metal (M).

'M' is preferably selected from the group consisting of zirconium (Zr), hafnium (Hf), or titanium (Ti), more preferably selected from the group consisting of zirconium (Zr) and hafnium (Hf). 'X' is preferably a halogen, most preferably Cl.

Most preferably, the organometallic compound (X) is a metallocene complex which comprises a transition metal compound, as defined above, which contains a cyclopentadienyl, indenyl or fluorenyl ligand as the substituent 'L'. Further, the ligands 'L' may have substituents, such as alkyl groups, aryl groups, arylalkyl groups, alkylaryl groups, silyl groups, siloxy groups, alkoxy groups or other heteroatom groups or the like. Suitable metallocene catalysts are known in the art and are disclosed, among others, in WO-A-95/12622, WO-A-96/32423, WO-A-97/28170, WO-A-98/32776, WO-A-99/61489, WO-A-03/010208, WO-A-03/051934, WO-A-03/051514, WO-A-2004/085499, EP-A-1752462 and EP-A-1739103.

Most preferred single site catalyst is a metallocene catalyst which means the catalytically active metallocene complex, as defined above, together with a cocatalyst, which is also known as an activator. Suitable activators are metal alkyl compounds and especially aluminium alkyl compounds known in the art. Especially suitable activators used with metallocene catalysts are alkylaluminium oxy-compounds, such as methylalumoxane (MAO), tetraisobutylalumoxane (TIBAO) or hexaisobutylalumoxane (HIBAO).

More preferably the ethylene polymers (B1) and (B2) of the copolymer of ethylene (B) are produced using, i.e. in the presence of, the same metallocene catalyst.

The multimodal copolymer of ethylene (B) may be produced in any suitable polymerization process known in the art. The ethylene polymer (B1) is preferably produced in a first polymerization zone and the ethylene polymer (B2) is produced in a second polymerization zone. The first polymerization zone and the second polymerization zone may be connected in any order, i.e. the first polymerization zone may precede the second polymerization zone, or the second polymerization zone may precede the first polymerization zone or, alternatively, polymerization zones may be connected in parallel. However, it is preferred to operate the polymerization zones in cascaded mode. The polymerization zones may operate in slurry, solution, or gas phase conditions or their combinations. Suitable processes comprising cascaded slurry and gas phase polymerization stages are disclosed, among others, in WO-A-92/12182 and WO-A-96/18662.

It is often preferred to remove the reactants of the preceding polymerization stage from the polymer before introducing it into the subsequent polymerization stage. This is preferably done when transferring the polymer from one polymerization stage to another.

The catalyst may be transferred into the polymerization zone by any means known in the art. For example, it is possible to suspend the catalyst in a diluent and maintain it as homogeneous slurry, to mix the catalyst with a viscous mixture of grease and oil and feed the resultant paste into the polymerization zone or to let the catalyst settle and introduce portions of thus obtained catalyst mud into the polymerization zone.

The polymerization, preferably of the ethylene polymer (B1), in the first polymerization zone is preferably conducted in slurry. Then the polymer particles formed in the polymerization, together with the catalyst fragmented and dispersed within the particles, are suspended in the fluid hydrocarbon. The slurry is agitated to enable the transfer of reactants from the fluid into the particles.

The polymerization usually takes place in an inert diluent, typically a hydrocarbon diluent such as methane, ethane, propane, n-butane, isobutane, pentanes, hexanes, heptanes, octanes etc., or their mixtures. Preferably, the diluent is a low-boiling hydrocarbon having from 1 to 4 carbon atoms or a mixture of such hydrocarbons and preferred diluent is propane.

The ethylene content in the fluid phase of the slurry may be from 2 to about 50 mol-%, preferably from about 2 to about 20 mol-% and in particular from about 3 to about 12 mol-%.

The temperature in the slurry polymerization is typically from 50 to 115° C., preferably from 60 to 110° C. and in particular from 70 to 100° C. The pressure is from 1 to 150 bar, preferably from 10 to 100 bar.

The slurry polymerization may be conducted in any known reactor used for slurry polymerization. Such reactors include a continuous stirred tank reactor and a loop reactor. It is especially preferred to conduct the polymerization in loop reactor. In such reactors the slurry is circulated with a high velocity along a closed pipe by using a circulation pump. Loop reactors are generally known in the art and examples are given, for instance, in U.S. Pat. Nos. 4,582,816, 3,405,109, 3,324,093, EP-A-479186 and U.S. Pat. No. 5,391,654.

It is sometimes advantageous to conduct the slurry polymerization above the critical temperature and pressure of the fluid mixture. Such operation is described in U.S. Pat. No. 5,391,654. In such operation the temperature is typically from 85 to 110° C., preferably from 90 to 105° C. and the pressure is from 40 to 150 bar, preferably from 50 to 100 bar.

The slurry may be withdrawn from the reactor either continuously or intermittently. A preferred way of intermittent withdrawal is the use of settling legs where slurry is allowed to concentrate before withdrawing a batch of the concentrated slurry from the reactor. The continuous withdrawal is advantageously combined with a suitable concentration method, e.g. as disclosed in EP-A-1310295 and EP-A-1591460.

Hydrogen may be fed into the reactor to control the molecular weight of the polymer as known in the art. Furthermore, one or more alpha-olefin comonomers are added into the reactor e.g. to control the density of the polymer product. The actual amount of such hydrogen and comonomer feeds depends on the catalyst that is used and the desired melt index (or molecular weight) and density (or comonomer content) of the resulting polymer.

The polymerization, preferably of the ethylene polymer (B2), in the second polymerization zone is preferably conducted in gas phase, preferably in a fluidized bed reactor, in a fast fluidized bed reactor or in a settled bed reactor or in any combination of these. The polymerization in the second polymerization zone is more preferably conducted in a fluidized bed gas phase reactor, wherein ethylene is polymerized together with at least one comonomer in the presence of a polymerization catalyst and, preferably in the presence of the reaction mixture from the first polymerization zone comprising the ethylene polymer (A) in an upwards moving gas stream. The reactor typically contains a fluidized bed comprising the growing polymer particles containing the active catalyst located above a fluidization grid.

The polymer bed is fluidized with the help of the fluidization gas comprising the olefin monomer, eventual comonomer(s), eventual chain growth controllers or chain transfer agents, such as hydrogen, and eventual inert gas. The fluidization gas is introduced into an inlet chamber at the bottom of the reactor. One or more of the above-mentioned components may be continuously added into the fluidization gas to compensate for losses caused, among other, by reaction or product withdrawal.

The fluidization gas passes through the fluidized bed. The superficial velocity of the fluidization gas must be higher that minimum fluidization velocity of the particles contained in the fluidized bed, as otherwise no fluidization would occur. On the other hand, the velocity of the gas should be lower than the onset velocity of pneumatic transport, as otherwise the whole bed would be entrained with the fluidization gas.

When the fluidization gas is contacted with the bed containing the active catalyst the reactive components of the gas, such as monomers and chain transfer agents, react in the presence of the catalyst to produce the polymer product. At the same time the gas is heated by the reaction heat.

The unreacted fluidization gas is removed from the top of the reactor and cooled in a heat exchanger to remove the heat of reaction. The gas is cooled to a temperature which is lower than that of the bed to prevent the bed from heating because of the reaction. It is possible to cool the gas to a temperature where a part of it condenses. When the liquid droplets enter the reaction zone they are vaporised. The vaporisation heat then contributes to the removal of the reaction heat. This kind of operation is called condensed mode and variations of it are disclosed, among others, in WO-A-2007/025640, U.S. Pat. No. 4,543,399, EP-A-699213 and WO-A-94/25495. It is also possible to add condensing agents into the recycle gas stream, as disclosed in EP-A-696293. The condensing agents are non-polymerizable components, such as n-pentane, isopentane, n-butane or isobutane, which are at least partially condensed in the cooler.

The gas is then compressed and recycled into the inlet chamber of the reactor. Prior to the entry into the reactor fresh reactants are introduced into the fluidization gas stream to compensate for the losses caused by the reaction and product withdrawal. It is generally known to analyze the composition of the fluidization gas and introduce the gas components to keep the composition constant. The actual composition is determined by the desired properties of the product and the catalyst used in the polymerization.

The catalyst may be introduced into the reactor in various ways, either continuously or intermittently. Where the gas phase reactor is a part of a reactor cascade the catalyst is usually dispersed within the polymer particles from the preceding polymerization stage. The polymer particles may be introduced into the gas phase reactor as disclosed in EP-A-1415999 and WO-A-00/26258. Especially if the preceding reactor is a slurry reactor it is advantageous to feed the slurry directly into the fluidized bed of the gas phase reactor as disclosed in EP-A-887379, EP-A-887380, EP-A-887381 and EP-A-991684.

The polymeric product may be withdrawn from the gas phase reactor either continuously or intermittently. Combinations of these methods may also be used. Continuous withdrawal is disclosed, among others, in WO-A-00/29452. Intermittent withdrawal is disclosed, among others, in U.S. Pat. No. 4,621,952, EP-A-188125, EP-A-250169 and EP-A-579426.

Also antistatic agent(s), such as water, ketones, aldehydes and alcohols, may be introduced into the gas phase reactor if needed. The reactor may also include a mechanical agitator to further facilitate mixing within the fluidized bed.

Typically the fluidized bed polymerization reactor is operated at a temperature within the range of from 50 to 100° C., preferably from 65 to 90° C. The pressure is suitably from 10 to 40 bar, preferably from 15 to 30 bar.

The polymerization of at least ethylene polymer (B1) and ethylene polymer (B2) in the first and second polymerization zones may be preceded by a prepolymerization step. The purpose of the prepolymerization is to polymerize a small amount of polymer onto the catalyst at a low temperature and/or a low monomer concentration. By prepolymerization it is possible to improve the performance of the catalyst in slurry and/or modify the properties of the final polymer. The prepolymerization step may be conducted in slurry or in gas phase. Preferably prepolymerization is conducted in slurry, preferably in a loop reactor. The prepolymerization is then preferably conducted in an inert diluent, preferably the diluent is a low-boiling hydrocarbon having from 1 to 4 carbon atoms or a mixture of such hydrocarbons.

The temperature in the prepolymerization step is typically from 0 to 90° C., preferably from 20 to 80° C. and more preferably from 40 to 70° C.

The pressure is not critical and is typically from 1 to 150 bar, preferably from 10 to 100 bar.

The catalyst components are preferably all introduced to the prepolymerization step. Preferably the reaction product of the prepolymerization step is then introduced to the first polymerization zone. Also preferably, as mentioned above, the prepolymer component is calculated to the amount of the ethylene polymer (B1).

It is within the knowledge of a skilled person to adapt the polymerization conditions in each step as well as feed streams and resident times to obtain the copolymer of ethylene (B).

The copolymer of ethylene (B) comprising at least, and preferably solely, the ethylene polymers (B1) and (B2) obtained from the second polymerization zone, which is preferably a gas phase reactor as described above, is the subjected to conventional post reactor treatment to remove i. a. the unreacted components.

Thereafter, typically, the obtained polymer is extruded and pelletized. The extrusion may be conducted in the manner generally known in the art, preferably in a twin screw extruder. One example of suitable twin screw extruders is a co-rotating twin screw extruder. Those are manufactured, among others, by Coperion or Japan Steel Works. Another example is a counter-rotating twin screw extruder. Such extruders are manufactured, among others, by Kobe Steel and Japan Steel Works. Before the extrusion at least part of the desired additives, as mentioned above, are preferably mixed with the polymer. The extruders typically include a melting section where the polymer is melted and a mixing section where the polymer melt is homogenised. Melting and homogenisation are achieved by introducing energy into the polymer. Suitable level of specific energy input (SEI) is from about 150 to about 450 kWh/ton polymer, preferably from 175 to 350 kWh/ton.

Preparation of the Heterophasic Polyolefin Composition

Preferably, the heterophasic polyolefin composition of the invention is prepared by a method, which produces a homogenous mixture of the various components. Typically, compounding is employed. Compounding usually involves mixing or/and blending the various components in a molten state, often by extrusion.

Use of the Heterophasic Polyolefin Composition

The present invention relates to an article comprising the heterophasic polyolefin composition of the invention and as described above and to the use of said heterophasic polyolefin composition for the production of an article. Preferable articles include films and moulded articles.

The films may be prepared by known method in the art, such as casting or extrusion. The films may be multilayer or monolayer films, but are preferably monolayer films. Moreover, the films preferably consist of the polyolefin composition as the sole polymer component.

As used herein the term 'moulded article' denotes articles that are produced by any conventional moulding technique, e.g. injection moulding, stretch moulding, compression moulding, rotomoulding or injection stretch blow moulding. Articles produced by injection moulding, stretch moulding, or injection stretch blow moulding are preferred. Articles produced by injection moulding are especially preferred. The moulded articles preferably are thin-walled articles having a wall thickness of 300 µm to 2 mm. More preferably, the thin-walled articles have a wall thickness of 300 µm to 1400 µm, and even more preferably the thin-walled articles have a wall thickness of 500 µm to 900 µm. The moulded articles of the current invention can be containers, such as cups, buckets, beakers, trays or parts of such articles, such as see-through-windows, lids, or the like.

The articles the invention may be employed in a number of end applications, in particular thin wall packaging applications and food packaging applications. The articles of the current invention are especially suitable for containing food, especially frozen food, such as ice-cream, frozen liquids, sauces, pre-cooked convenience products, and the like.

Measurement Method

Any parameter mentioned above in the detailed description of the invention is measured according to the tests given below.

Melt Flow Rate

The melt flow rate (MFR) is determined according to ISO 1133 and is indicated in g/10 min. The MFR is an indication of the melt viscosity of the polymer. The MFR is determined at 190° C. for PE and 230° C. for PP. The load under which the melt flow rate is determined is usually indicated as a subscript, for instance $MFR_2$ is measured under 2.16 kg load (condition D).

Density

Density of the polymer was measured according to ISO 1183/1872-2B. For the purpose of this invention the density of the blend can be calculated from the densities of the components according to:

$$\rho_b = \sum_i w_i \cdot \rho_i$$

where
$\rho_b$ is the density of the blend,
$w_i$ is the weight fraction of component 'i' in the blend and
$\rho_i$ is the density of the component 'i'.

Quantification of Microstructure by NMR Spectroscopy

Quantitative nuclear-magnetic resonance (NMR) spectroscopy was used to quantify the comonomer content of the polymers. Quantitative $^{13}C\{^1H\}$ NMR spectra recorded in the molten-state using a Bruker Avance III 500 NMR spectrometer operating at 500.13 and 125.76 MHz for 1H and 13C respectively. All spectra were recorded using a $^{13}C$ optimised 7 mm magic-angle spinning (MAS) probe head at 180° C. using nitrogen gas for all pneumatics. Approximately 200 mg of material was packed into a 7 mm outer diameter zirconia MAS rotor and spun at 4 kHz. This setup was chosen primarily for the high sensitivity needed for rapid identification and accurate quantification. Standard single-pulse excitation was employed utilising the NOE at short recycle delays and the RS-HEPT decoupling scheme. A total of 1024 (1 k) transients were acquired per spectra using a 3 s recycle delay.

Quantitative $^{13}C\{^1H\}$ NMR spectra were processed, integrated and relevant quantitative properties determined from the integrals. All chemical shifts are internally referenced to the methyl isotactic pentad (mmmm) at 21.85 ppm.

Basic Comonomer Content Method Spectral Analysis Method:

Characteristic signals corresponding to the incorporation of 1-butene were observed and the comonomer content quantified in the following way.

The amount of 1-butene incorporated in PPBPP isolated sequences was quantified using the integral of the $\alpha B2$ sites at 43.6 ppm accounting for the number of reporting sites per comonomer:

$$B = I_\alpha/2$$

The amount of 1-butene incorporated in PPBBPP double consecutively sequences was quantified using the integral of the $\alpha\alpha B2B2$ site at 40.5 ppm accounting for the number of reporting sites per comonomer:

$$BB = 2*I_{\alpha\alpha}$$

When double consecutive incorporation was observed the amount of 1-butene incorporated in PPBPP isolated sequences needed to be compensated due to the overlap of the signals $\alpha B2$ and $\alpha B2B2$ at 43.9 ppm:

$$B = (I_\alpha - 2*I_{\alpha\alpha})/2$$

The total 1-butene content was calculated based on the sum of isolated and consecutively incorporated 1-butene:

$$B_{total} = B + BB$$

The amount of propene was quantified based on the main $S\alpha\alpha$ methylene sites at 46.7 ppm and compensating for the relative amount of $\alpha B2$ and $\alpha B2B2$ methylene unit of propene not accounted for (note B and BB count number of butene monomers per sequence not the number of sequences):

$$P_{total} = I_{S\alpha\alpha} + B + BB/2$$

The total mole fraction of 1-butene in the polymer was then calculated as:

$$f_B = B_{total}/(B_{total} + P_{total})$$

The full integral equation for the mole fraction of 1-butene in the polymer was:

$$f_B = (((I_\alpha - 2*I_{\alpha\alpha})/2) + (2*I_{\alpha\alpha}))/(I_{S\alpha\alpha} + ((I_\alpha - 2*I_{\alpha\alpha})/2) + ((2*I_{\alpha\alpha})/2)) + ((I_\alpha - 2*I_{\alpha\alpha})/2) + (2*I_{\alpha\alpha}))$$

This simplifies to:

$$f_B = (I_\alpha/2 + I_{\alpha\alpha})/(I_{S\alpha\alpha} + I_\alpha + I_{\alpha\alpha})$$

The total incorporation of 1-butene in mole percent was calculated from the mole fraction in the usual manner:

$$B[\text{mol-\%}] = 100*f_B$$

The total incorporation of 1-butene in weight percent was calculated from the mole fraction in the standard manner:

$$B[\text{wt.-\%}] = 100*(f_B*56.11)/((f_B*56.11) + ((1-f_B)*42.08))$$

Details of these procedures can be found in Katja Klimke, Matthew Parkinson, Christian Piel, Walter Kaminsky Hans Wolfgang Spiess, Manfred Wilhelm, *Macromol. Chem. Phys.* 2006, 207, 382; Matthew Parkinson, Katja Klimke, Hans Wolfgang Spiess, Manfred Wilhelm, *Macromol. Chem. Phys.* 2007, 208, 2128; Patrice Castignolles, Robert Graf, Matthew Parkinson, Manfred Wilhelm, Marianne Gaborieau:, *Polymer* 2009, 50, 2373; M. Pollard, K. Klimke, R. Graf, H. W. Spiess, M. Wilhelm, O. Sperber, C. Piel, W. Kaminsky, *Macromolecules* 2004, 37, 813; Xenia Filip, Carmen Tripon, Claudiu Filip, J. Magn. *Reson.* 2005, 176, 239; John M. Griffin, Carmen Tripon, Ago Samoson, Claudiu Filip, Steven P. Brown, *Mag. Res. in Chem.* 2007, 45(S1), S198; J. Randall Rev. *Macromol. Chem. Phys.* 1989, C29, 201.

Molecular Weight and Molecular Weight Distribution

Molecular weight averages ($M_z$, $M_w$ and $M_n$), Molecular weight distribution (MWD) and its broadness, described by polydispersity index, PDI=$M_w/M_n$ (wherein $M_n$ is the number average molecular weight and $M_w$ is the weight average molecular weight) were determined by Gel Permeation Chromatography (GPC) according to ISO 16014-1:2003, ISO 16014-2:2003, ISO 16014-4:2003 and ASTM D 6474-12 using the following formulas:

$$M_n = \frac{\sum_{i=1}^{N} A_i}{\sum_{i=1}^{N} (A_i/M_i)} \quad (1)$$

$$M_w = \frac{\sum_{i=1}^{N} (A_i \times M_i)}{\sum_{i=1}^{N} A_i} \quad (2)$$

$$M_z = \frac{\sum_{i=1}^{N} (A_i \times M_i^2)}{\sum_{i=1}^{N} (A_i/M_i)} \quad (3)$$

For a constant elution volume interval $\Delta V_i$, where $A_i$ and $M_i$ are the chromatographic peak slice area and polyolefin molecular weight (MW), respectively associated with the elution volume, $V_i$, where N is equal to the number of data points obtained from the chromatogram between the integration limits.

A high temperature GPC instrument, equipped with either infrared (IR) detector (IR4 or IR5 from PolymerChar (Valencia, Spain) or differential refractometer (RI) from Agilent Technologies, equipped with 3× Agilent-PLgel Olexis and 1× Agilent-PLgel Olexis Guard columns was used. As the solvent and mobile phase 1,2,4-trichlorobenzene (TCB) stabilized with 250 mg/L 2,6-Di-tert-butyl-4-methyl-phenol) was used. The chromatographic system was operated at 160° C. and at a constant flow rate of 1 mL/min. 200 μL of sample solution was injected per analysis. Data collection was performed using either Agilent Cirrus software version 3.3 or PolymerChar GPC-IR control software.

The column set was calibrated using universal calibration (according to ISO 16014-2:2003) with 19 narrow MWD polystyrene (PS) standards in the range of 0.5 kg/mol to 11500 kg/mol. The PS standards were dissolved at room temperature over several hours. The conversion of the polystyrene peak molecular weight to polyolefin molecular weights is accomplished by using the Mark Houwink equation and the following Mark Houwink constants:

$K_{PS} = 19 \times 10^{-3}$ mL/g, $\alpha_{PS} = 0.655$ $K_{PE} = 39 \times 10^{-3}$ mL/g, $\alpha_{PE} = 0.725$ $K_{PP} = 19 \times 10^{-3}$ mL/g, $\alpha_{PP} = 0.725$ A third order polynomial fit was used to fit the calibration data.

All samples were prepared in the concentration range of 0.5 to 1 mg/ml and dissolved at 160° C. for 2.5 hours (PP) or 3 hours (PE) under continuous gentle shaking.

Flexural Modulus (FM)

The flexural modulus was determined in a 3-point-bending test at 23° C. according to ISO 178 on 80×10×4 mm³ test bars injection moulded in line with EN ISO 1873-2.

Differential Scanning Calorimetry (DSC)

Differential scanning calorimetry (DSC) analysis, melting temperature ($T_m$) and melt enthalpy ($H_m$), crystallization temperature ($T_c$), and heat of crystallization ($H_c$, HCR) are measured with a TA Instrument Q200 differential scanning calorimetry (DSC) on 5 to 7 mg samples. DSC is run according to ISO 11357/part 3/method C2 in a heat/cool/heat cycle with a scan rate of 10° C./min in the temperature range of −30 to +225° C. Crystallization temperature ($T_c$) and heat of crystallization ($H_c$) are determined from the cooling step, while melting temperature ($T_m$) and melt enthalpy ($H_m$) are determined from the second heating step.

Throughout the present description, the term $T_c$ is understood as Peak temperature of crystallization as determined by DSC at a cooling rate of 10 K/min.

Haze

The haze is determined according to ASTM D1003-00 on 60×60×1 mm³ plaques injection molded in line with EN ISO 1873-2.

Notched Impact Strength (NIS)

The Charpy notched impact strength (NIS) was measured according to ISO 179 1eA at +23° C. or at 0° C., respectively, using injection molded bar test specimens of 80×10×4 mm³ prepared in accordance with EN ISO 1873-2. Charpy notched impact strength measured as defined above at +23° C. is denominated as (NIS+23° C.). Charpy notched impact strength measured as defined above at 0° C. is denominated as (NIS 0° C.).

Optomechnical Ability (OMA)

Optomechnical ability (OMA) is understood as the ratio of mechanical (especially impact and flexural) behaviour, to optical performance, namely haze, wherein the mechanical properties are targeted to be as high as possible and the optical performance is desired to be as low as possible. The optomechanical ability is determined according the formula given below:

$$OMA = \frac{\text{Flex Modulus}[MPa] * NIS\left[\frac{kJ}{m^2}\right]}{\text{Haze}(1 \text{ mm})[\%]}$$

OMA calculated from NIS (+23° C.) as defined above is denominated as OMA (+23° C.). Likewise, OMA calculated from NIS (0° C.) as defined above is denominated as OMA (0° C.).

Xylene Soluble Fraction

The xylene soluble fraction (XCS) is determined according to ISO 16152 at 25° C.

EXAMPLES

Catalyst Preparation for the Polymerization of Component (A)

The catalyst used in the polymerisation processes for the propylene butene random copolymer (A) of the examples was prepared as follows:

The metallocene (MC1) (rac-anti-dimethylsilandiyl(2-methyl-4-phenyl-5-methoxy-6-tert-butyl-indenyl)(2-methyl-4-(4-tert-butylphenyl)indenyl)zirconium dichloride) has been synthesized as described in WO 2013/007650.

The catalyst was prepared using metallocene MC1 and a catalyst system of MAO and trityl tetrakis(pentafluorophenyl)borate according to Catalyst 3 of WO 2015/11135 with the proviso that the surfactant is 2,3,3,3-tetrafluoro-2-(1,1,2,2,3,3,3-heptafluoropropoxy)-1-propanol.

Preparation of the Component (A)

Component (A) was prepared in a two stage polymerisation process, under the conditions outlined in Table 1, using a catalyst as defined above. The MFR of the final polymer was adjusted using visbreaking to the value shown in Table 1. Properties of the various fractions and final multimodal copolymer are also presented in Table 1.

TABLE 1

| Process conditions and properties for component (A) | |
| --- | --- |
|  | (A) |
| Prepoly reactor | |
| Temperature [° C.] | 20 |
| Residence time (min) | 20 |
| Loop reactor (A1) | |
| Temperature [° C.] | 75 |
| Feed $H_2/C_3$ ratio [mol/kmol] | 0.1 |
| Feed $C_4/C_3$ ratio [mol/kmol] | 28.4 |

TABLE 1-continued

Process conditions and properties for component (A)

|  | (A) |
| --- | --- |
| Split [wt.-%] | 45 |
| $MFR_2$ (230° C.) [g/10 min]) | 2.0 |
| $C_4$ content in loop [wt.-%] | 5.0 |
| Gas phase reactor (A2) |  |
| Temperature [° C.] | 80 |
| $H_2/C_3$ ratio [mol/kmol] | 1.0 |
| $C_4/C_3$ ratio [mol/kmol] | 26 |
| Split [wt.-%] | 55 |
| $MFR_2$ powder (230° C.) [g/10 min]) | 1.3 |
| $MFR_2$ in GPR (230° C.) [g/10 min] | 0.6 |
| $C_4$ content made in GPR [wt.-%] | 2.6 |
| Pellet |  |
| $C_4$ total [wt.-%] | 3.7 |
| $MFR_2$ pellets (230° C.) [g/10 min] | 1.1 |
| Tm [° C.] | 143 |
| XCS [wt.-%] | 0.9 |
| $C_6$ FDA [wt.-%] | 0.67 |
| Flexural modulus [MPa] | 1227 |

The pelletization was done on a ZSK 32 twin screw extruder. The desired amount of PP powder and additives (1000 ppm of Irganox B215, a 1:2-mixture of Pentaerythrityl-tetrakis(3-(3',5'-di-tert. butyl-4-hydroxyphenyl)-propionate, CAS-no. 6683-19-8, and Tris (2,4-di-t-butylphenyl) phosphite, CAS-no. 31570-04-4), supplied by BASF AG, Germany, 500 ppm of calcium stearate, CAS No. 1592-23-0, supplied by Baerlocher GmbH, Germany) were mixed and extruded at 220° C., with a throughput of 100 kg/h. The properties measured on the pellets are reported in Table 1 as CE1.

Catalyst Preparation for the Polymerization of Component (B)

130 grams of a metallocene complex bis(1-methyl-3-n-butylcyclopentadienyl) zirconium (IV) dichloride (CAS no. 151840-68-5), and 9.67 kg of a 30% solution of commercial methylalumoxane (MAO) in toluene were combined and 3.18 kg dry, purified toluene was added. The thus obtained complex solution was added onto 17 kg silica carrier Sylopol 55 SJ (supplied by Grace) by very slow uniform spraying over 2 hours. The temperature was kept below 30° C. The mixture was allowed to react for 3 hours after complex addition at 30° C.

Polymerization of Component (B)

(B)1 and (B)2 are copolymer of ethylene with 1-butene and 1-hexene comonomers prepared in a three reactor setup (loop1-loop2-GPR1) and a prepolymerization loop reactor.

Prepolymerization: A loop reactor having a volume of 50 $dm^3$ was operated at a temperature of 50° C. and a pressure of 5.7 MPa.

A first loop reactor (loop 1) having a volume of 150 $dm^3$ was operated at 85° C. temperature and 5.5 MPa. A second loop reactor (loop 2) with a volume of 350 $dm^3$ was operated at 85° C. and 5.4 MPa. From there the polymer was directed to a flash vessel operated at 300 kPa and then to a gas phase reactor (GPR1) operated at a pressure of 2.2 MPa and a temperature of 75° C. Polymerization conditions and material properties were as recited in table 2 and 3 below. Two polymers have been produced ((B)1 and (B)2).

TABLE 2

Process conditions for component (B)

|  | (B)1 | (B)2 |
| --- | --- | --- |
| Prepoly reactor |  |  |
| Catalyst feed [g/h] | 27.36 | 33.10 |
| $H_2$ feed [g/h] | 0.20 | 0.00 |
| $C_4$ feed [g/h] | 100 | 0.00 |
| Residence time [h] | 0.2 | 0.2 |
| Loop reactor 1 |  |  |
| $H_2/C_2$ ratio [mol/kmol] | 0.34 | 0.53 |
| $C_4/C_2$ ratio [mol/kmol] | 66.5 | 80.3 |
| Split [wt.-%] | 19.7 | 20.4 |
| $MFR_2$ of loop 1 material [g/10 min] | 2.1 | 6.0 |
| Density of loop 1 material [kg/$m^3$] | 939 | 939 |
| Loop reactor 2 |  |  |
| $H_2/C_2$ ratio [mol/kmol] | 0.25 | 0.17 |
| $C_4/C_2$ ratio [mol/kmol] | 113.4 | 110.3 |
| Split [wt.-%] | 19.9 | 20.8 |
| $MFR_2$ of loop 2 material [g/10 min] | 20.4 | 5.7 |
| Density of loop 2 material [kg/$m^3$] | 943 | 938 |
| $MFR_2$ after loop 2 [g/10 min] | 7.0 | 5.9 |
| Density after loop 2 [kg/$m^3$] | 941 | 939 |
| Gas phase reactor |  |  |
| $C_2$ partial pressure [kPa] | 632.0 | 527.2 |
| $H_2/C_2$ ratio [mol/kmol] | 0.18 | 0.24 |
| $C_6/C_2$ ratio [mol/kmol] | 32.9 | 47.4 |
| Split [wt.-%] | 57.6 | 58.8 |
| $MFR_2$ of GPR material [g/10 min] | 0.61 | 1.65 |
| Density of GPR material [kg/$m^3$] | 901 | 895 |

TABLE 3

Properties of component (B)

|  | (B)1 | (B)2 |
| --- | --- | --- |
| $MFR_2$ (190° C.) [g/10 min] | 1.7 | 2.8 |
| $MFR_{21.6}$ (190° C.) [g/10 min] | 35.7 | 57.5 |
| $MFR_{21}/MFR_2$ (190° C.) | 20.9 | 20.7 |
| $M_n$ [g/mol] | 21750 | 20550 |
| $M_w$ [g/mol] | 91400 | 81350 |
| $M_z$ [g/mol] | 178500 | 155000 |
| $M_w/M_n$ [-] | 4.2 | 4.0 |
| Density [kg/$m^3$] | 918 | 913 |
| $C_4$ [mol-%] | 0.2 | 0.2 |
| $C_6$ [mol-%] | 2.8 | 3.6 |

Exceed 1018 is a linear low density polyethylene prepared using a metallocene catalyst (mLLDPE) distributed by Dow Chemical (USA). It has a density of 918 kg/$m^3$, $MFR_2$ (190° C.) of 1.0 g/10 min, and a $T_m$ of 119° C. It is used in IE1 as component (B).

Vistamaxx 6202 is a high MFR $C_2C_3$ based plastomer with very low $C_2$ content. It is distributed by ExxonMobil (USA) and described as impact- and transparency modifier for PP copolymers. It has a density of 862 kg/$m^3$, an $MFR_2$ (190° C.) of 9.1 g/10 min, and 15 wt.-% $C_2$ content. It is used in CE2 and CE3 as component (B).

Queo 0201 is a $C_2C_8$ plastomer prepared using a metallocene catalyst (mPE) plastomer with an $MFR_2$ (190° C.) of 1.1 g/10 min and density of 902 kg/$m^3$. It is distributed by Borealis AG (Austria). It is used in CE4 as component (B).

Component (C) as used in IE5 is a polypropylene homopolymer with an $MFR_2$ (230° C.) of 2.0 g/10 min and a melting temperature of 165° C., produced with a Ziegler-Natta type catalyst in the Borealis nucleation technology (BNT) and comprising a polymeric α-nucleating agent. It is distributed by Borealis AG (Austria).

Preparation of the Composition

TABLE 4

Properties of the compositions

| | Unit | CE1 | CE2 | CE3 | CE4 | IE1 | IE2 | IE3 | IE4 | IE5 |
|---|---|---|---|---|---|---|---|---|---|---|
| (A) | wt.-% | 100 | 80 | 90 | 90 | 80 | 80 | 90 | 80 | 78 |
| (B)1 | wt.-% | | | | | | | 10 | 20 | 20 |
| (B)2 | wt.-% | | | | | | 20 | | | |
| Exceed 1018 | wt.-% | | | | | 20 | | | | |
| (C) | wt.-% | | | | | | | | | 2 |
| Vistamaxx 6202 | wt.-% | | 20 | 10 | | | | | | |
| Queo 0201 | wt.-% | | | | 10 | | | | | |
| $MFR_2$ | g/10 min | 1.1 | 1.95 | 1.58 | 1.76 | 1.45 | 1.70 | 1.28 | 1.40 | 1.44 |
| $T_c$ | °C | 108 | 107 | 107 | 106 | 107 | 107 | 107 | 107 | 112 |
| $T_{m1}$ | °C | 143 | 143 | 143 | 144 | 143 | 142 | 143 | 143 | 144 |
| $T_{m2}$ | °C | — | 94 | 94 | 76 | 120 | 122 | 121 | 121 | 122 |
| XCS | wt.-% | 0.8 | 18.7 | 9.5 | 10.2 | 1.4 | 1.5 | 0.9 | 1.4 | 1.3 |
| Haze | % | 44 | 42 | 48 | 36 | 25 | 20 | 31 | 20 | 22 |
| Flex. Modulus | MPa | 1227 | 647 | 871 | 984 | 985 | 928 | 1089 | 978 | 1022 |
| Charpy NIS (+23° C.) | $kJ/m^2$ | 4.7 | 47.5 | 8.1 | 21.4 | 8.8 | 22.0 | 8.2 | 25.2 | 29.8 |
| Charpy NIS (0° C.) | $kJ/m^2$ | — | 3.4 | 1.9 | 3.1 | 3.4 | 1.9 | 2.0 | 3.0 | 3.1 |
| OMA (+23° C.) | $kJMPa/m^2$ | 131 | 732 | 147 | 588 | 347 | 1021 | 287 | 1231 | 1383 |
| OMA (0° C.) | $kJMPa/m^2$ | — | 52 | 34 | 85 | 134 | 89 | 70 | 149 | 144 |

Component (A) was compounded with the desired amount of component (B) and (C), if applicable, on a ZSK 18 extruder and then injection moulded into specimens for the respective tests. The performance of the materials can be seen in Table 4.

As can be seen in CE2, C3-based low-density plastomers such as Vistamaxx 6202 cannot provide the desired properties. The flexural modulus is very low and the haze is very high. Furthermore, C2-based low-density plastomers such as Queo 0201 can give good mechanical properties. However, the haze is too high (cf. CE3 vs. IE3). The inventive examples show that mLLDPEs significantly improve the balance of mechanical and optical properties (IE1-5). Furthermore, it can be seen that multimodal mLLDEs show even better performance (IE2-5). Finally, the properties can be further improved when a nucleating agent is used (IE5).

The invention claimed is:

1. A heterophasic polyolefin composition comprising:
   55 to 95 wt.-% based on the total weight of the heterophasic polyolefin composition of a propylene butene random copolymer (A) having an $MFR_2$ measured at 230° C. of 0.3 to 100.0 g/10 min and a butene content of 1.5 to 8.0 wt.-%, wherein the propylene butene random copolymer is obtained by a process using a single site catalyst (I); and
   5 to 45 wt.-% based on the total weight of the heterophasic polyolefin composition of a copolymer of ethylene (B) having a density in the range of 910 to 935 kg/m³ and an $MFR_2$ measured at 190° C. of 0.5 to 10 g/10 min, wherein the copolymer of ethylene (B) is obtained by a process using a single site catalyst (11);
   wherein the heterophasic polyolefin composition has a xylene soluble content (XCS) of less than 5.0 wt.-%.

2. Heterophasic polyolefin composition according to claim 1, wherein the propylene butene random copolymer (A) has an $MFR_2$ measured at 230° C. of from 1.0 to 20.0 g/10 min.

3. Heterophasic polyolefin composition according to claim 1, wherein the propylene butene random copolymer (A) is a multimodal copolymer.

4. Heterophasic polyolefin composition according to claim 3, wherein the propylene butene random copolymer (A) comprises:
   30 to 70 wt.-% of a propylene butene copolymer (A1) having an $MFR_2$ measured at 230° C. of 0.5 to 20.0 g/10 min and a butene content of 0.5 to 12.0 wt.-%; and
   70 to 30 wt.-% of a propylene butene copolymer (A2) having an $MFR_2$ measured at 230° C. of 0.5 to 20.0 g/10 min and a butene content of 0.5 to 10.0 wt.-%;
   wherein the propylene butene copolymer (A1) and the propylene butene copolymer (A2) are different and wherein propylene butene copolymers (A1) and (A2) add up to 100 wt.-%.

5. Heterophasic polyolefin composition according to claim 1, wherein said single site catalyst (I) and/or (II) are/is a metallocene catalyst.

6. Heterophasic polyolefin composition according to claim 1, wherein the copolymer of ethylene (B) is a multimodal polymer, wherein the copolymer of ethylene (B) comprises an ethylene polymer component (B1) and an ethylene polymer component (B2), wherein the $MFR_2$ measured at 190° C. of the ethylene polymer component (B1) is different from the $MFR_2$ measured at 190° C. of the ethylene polymer component (B2).

7. Heterophasic polyolefin composition according to claim 1, wherein the copolymer of ethylene (B) is a linear low density polyethylene (LLDPE).

8. Heterophasic polyolefin composition according to claim 1, wherein the copolymer of ethylene (B) is a terpolymer of ethylene and at least two different comonomers selected from alpha-olefins having from 4-10 carbon atoms.

9. Heterophasic polyolefin composition according to claim 1 further comprising a nucleating agent.

10. Heterophasic polyolefin composition according to claim 1, wherein said heterophasic composition has a flexural modulus of at least 800 MPa.

11. Heterophasic polyolefin composition according to claim 1, wherein the heterophasic polyolefin composition wherein the composition has an impact strength at +23° C. of at least 8 $kJ/m^2$, in a Charpy notched test according to ISO 179 1eA.

12. Heterophasic polyolefin composition according to claim 1, wherein said heterophasic polyolefin composition has a haze of 40% or less.

13. Heterophasic polyolefin composition according to claim 1, wherein the heterophasic polyolefin composition has an Optomechnical ability at +23° C. (OMA (+23° C.)) of more than 280 kJMPa/m$^2$.

14. An article comprising a heterophasic polyolefin composition according to claim 1.

15. Heterophasic polyolefin composition according to claim 1, where said heterophasic composition has a flexural modulus of at least 800 MPa, and has an impact strength at +23° C. of at least 8 kJ/m$^2$ in a Charpy notched test according to ISO 179 1eA, and has a haze of 40% or less, and has an Optomechnical ability at +23° C. (OMA (+23° C.)) of more than 280 kJMPa/m$^2$.

16. Heterophasic polyolefin composition according to claim 1, wherein said heterophasic composition has a flexural modulus of at least 1000 MPa.

17. Heterophasic polyolefin composition according to claim 1, wherein the heterophasic polyolefin composition wherein the composition has an impact strength at +23° C. of at least 20 kJ/m$^2$ in a Charpy notched test according to ISO 179 1eA.

18. Heterophasic polyolefin composition according to claim 1, wherein said heterophasic polyolefin composition has a haze of 30% or less.

19. Heterophasic polyolefin composition according to claim 1, wherein the heterophasic polyolefin composition has an Optomechnical ability at +23° C. (OMA (+23° C.)) of more than 800 kJMPa/m$^2$.

20. The heterophasic polyolefin composition of claim 4, wherein the propylene butene random copolymer (A) and the copolymer of ethylene (B) are the only polymer components in the heterophasic polyolefin composition.

* * * * *